US008659682B2

(12) United States Patent
Matsuda et al.

(10) Patent No.: US 8,659,682 B2
(45) Date of Patent: Feb. 25, 2014

(54) SOLID-STATE IMAGING APPARATUS

(75) Inventors: Seisuke Matsuda, Hachioji (JP); Toru Kondo, Hino (JP)

(73) Assignee: Olympus Corporation, Tokyo (JP)

( * ) Notice: Subject to any disclaimer, the term of this patent is extended or adjusted under 35 U.S.C. 154(b) by 437 days.

(21) Appl. No.: 12/475,021

(22) Filed: May 29, 2009

(65) Prior Publication Data
US 2009/0295968 A1 Dec. 3, 2009

(30) Foreign Application Priority Data

May 30, 2008 (JP) ................................ 2008-141877
Jun. 9, 2008 (JP) ................................ 2008-150051

(51) Int. Cl.
*H04N 5/217* (2011.01)
*H04N 5/335* (2011.01)

(52) U.S. Cl.
USPC ........................... 348/241; 348/302; 348/308

(58) Field of Classification Search
USPC ......... 348/241, 243, 245, 294, 300, 302, 308; 250/208.1
See application file for complete search history.

(56) References Cited

U.S. PATENT DOCUMENTS

| 5,233,180 | A | * | 8/1993 | Tsuruta et al. | ............. 250/208.1 |
| 5,933,189 | A | * | 8/1999 | Nomura | ........................ 348/302 |
| 6,166,769 | A | * | 12/2000 | Yonemoto et al. | ............ 348/308 |
| 7,339,616 | B2 | * | 3/2008 | Mabuchi et al. | ........... 348/220.1 |
| 7,368,698 | B2 | * | 5/2008 | Altice | ........................ 250/208.1 |
| 7,569,803 | B2 | * | 8/2009 | Yan et al. | .................... 250/208.1 |
| 2005/0285958 | A1 | * | 12/2005 | Matsuda | ....................... 348/300 |

FOREIGN PATENT DOCUMENTS

JP 2001-230974 A 8/2001

OTHER PUBLICATIONS

Hambley, Allan R. Electronics. Upper Saddle River, NJ: Prentice Hall, 2000. 677-79. Print.*

* cited by examiner

*Primary Examiner* — Zachary Wilkes
(74) *Attorney, Agent, or Firm* — Westerman, Hattori, Daniels & Adrian, LLP

(57) ABSTRACT

A solid-state imaging apparatus including: a pixel section having pixels two-dimensionally arranged into rows and columns each pixel containing a photoelectric converter, an amplifier for amplifying and outputting as pixel signal a signal electric charge of the photoelectric converter, and a reset circuit for resetting signal electric charges accumulated at the amplifier; a vertical scanning section for selecting a row to be read out of the pixel section; a vertical signal line provided column by column for outputting the signal from the pixel section; and a sample-and-hold type bias section connected to the vertical signal line containing at least a hold circuit for setting an electric current flowing into the amplifier. The sample-and-hold type bias section causes to generate an electric current corresponding to a voltage set at the hold circuit when signal electric charges accumulated at the photoelectric converter is read out from the amplifier.

2 Claims, 17 Drawing Sheets

9: SAMPLE-AND-HOLD BIAS SECTION

9: SAMPLE-AND-HOLD BIAS SECTION

9: SAMPLE-AND-HOLD BIAS SECTION

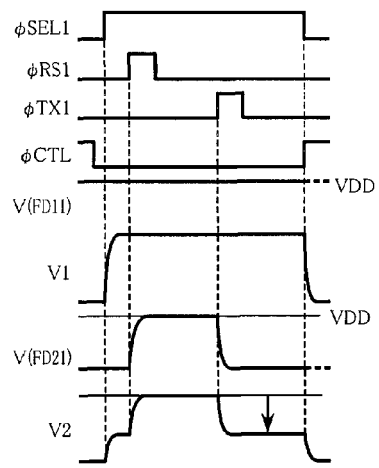
FIG. 10
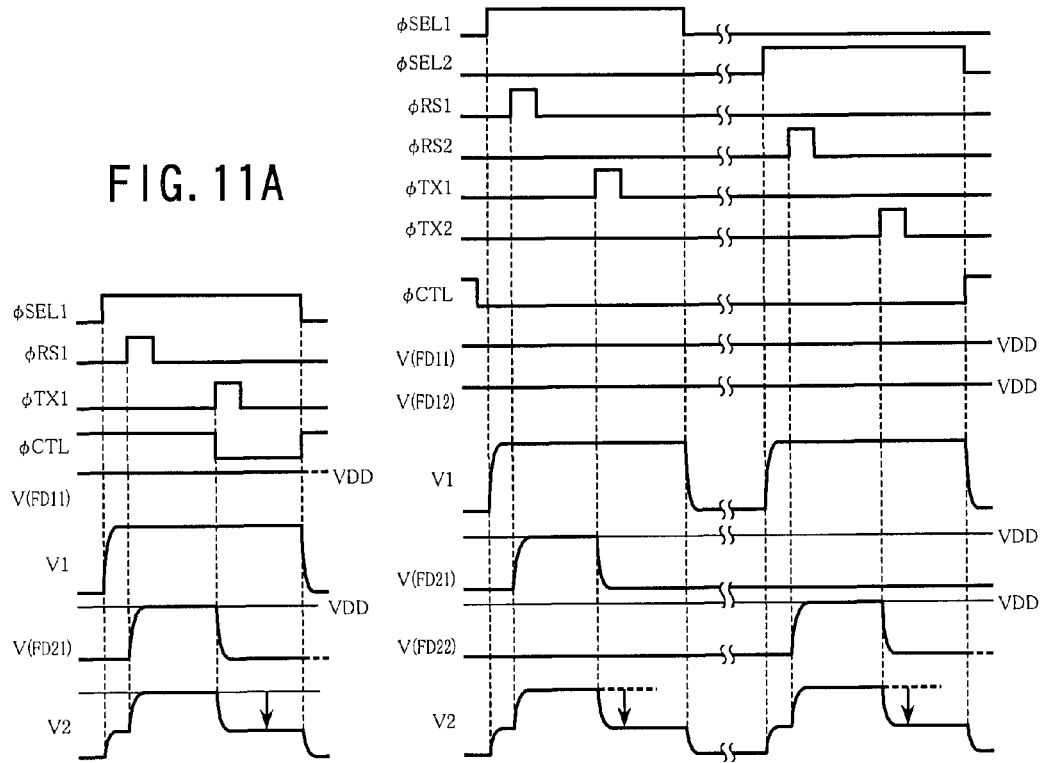
FIG. 11A
FIG. 11B

19: DMOS BIAS SECTION

19: DMOS BIAS SECTION

US 8,659,682 B2

SOLID-STATE IMAGING APPARATUS

This application claims benefit of Japanese Patent Applications No. 2008-141877 filed in Japan on May 30, 2008 and No. 2008-150051 filed in Japan on Jun. 9, 2008, the contents of which are incorporated by these references.

BACKGROUND OF THE INVENTION

The present invention relates to solid-state imaging apparatus, and more particularly to the solid-state imaging apparatus using amplified MOS sensor.

In recent years, those solid-state imaging apparatus where a solid-state imaging device referred to as amplified MOS sensor is used as the solid-state imaging apparatus are mounted for example on power-saving type solid-state imaging apparatus for mobile-equipment or on high-resolution electronic still cameras. For the current solid-state imaging apparatus using amplified MOS sensor, methods are proposed in which a pixel area having a plurality of pixel cells arranged into a matrix is selected row by row so that photoelectric charge is converted into a voltage signal and read out through an amplification means contained in each pixel cell. At this time, while a bias current is supplied to the amplification means in each pixel cell through a column-by-column bias means, the influence of resistance component of ground wirings to which the bias means is connected is becoming not ignorable due to the continuous development to increase the number of pixels. For example, at a pixel cell on which an intense light (i.e. a high-luminance light) is incident, an output level of the pixel cell is significantly lowered and goes beyond a normal operation range of the bias means whereby the bias current does not flow any longer. This change in electric current at the bias means causes a bias current of other pixel cell on the same one row to be increased through a resistance component occurring on the ground wiring. Because of this change in bias current, a white transverse stripe-like image is resulted on the pixel row that contains the pixel cell on which the intense light is incident.

Various methods have been proposed to reduce such white transverse stripe. FIG. 1 is a circuit diagram showing construction of the solid-state imaging apparatus disclosed in Japanese Patent Application Laid-Open 2001-230974, being an example of the solid-state imaging apparatus where such white transverse stripe is reduced. The solid-state imaging apparatus shown in FIG. 1 includes: a pixel section 2 having pixel cells 1 (Pixel11 to Pixel33) that are two-dimensionally arranged into row direction and column direction (3 rows by 3 columns in this case); a vertical scanning section 3 for selecting row to be read out of the pixel section 2; vertical signal lines V1 to V3 for outputting pixel signal column by column from the pixel section 2; a bias current section 4 for supplying an electric current to the amplification means of the pixel cell 1 through the vertical signal lines V1 to V3; and a clip section 5 for causing the potential of the vertical signal lines V1 to V3 to be clipped so that the bias current section 4 is restricted to its normal operation range.

Each of the pixel cells 1 indicated by Pixel11 to Pixel33, when Pixel11 is taken as representative, includes: a photodiode PD11 serving as photoelectric conversion section; a floating diffusion FD11 for converting electric charge accumulated at the photodiode PD11 into a voltage; a reset transistor M211 for resetting the floating diffusion FD11 to a pixel power supply voltage VDD; an amplification transistor M311 for amplifying the voltage of the floating diffusion FD11; and a row select transistor M411 for selecting each row. The pixel section 2 is constructed such that the pixel cells 1 are placed side by side into 3 rows by 3 columns as described above. The vertical scanning section 3 is to output reset control signals φRS1 to φRS3 for controlling operation of the reset transistors M211 to M233 and row select control signals φSEL1 to φSEL3 for controlling operation of the row select transistors M411 to M433.

The bias current section 4 includes: a bias current setting input transistor M40 of which the gate and drain are connected to a reference current input terminal Iref; and transistors for bias current M41 to M43 of which the drain is connected to the vertical signal line V1 to V3, the gate to the gate of the above described bias current setting input transistor M40, and the source to a ground line. It is to supply a bias current Ibias to the amplification transistor of the pixel cells of selected pixel row selected at the vertical scanning section 3. The clip section 5 includes: transistors for clipping M51 to M53 of which the gate is connected to a clip voltage input terminal Vclip; and clip select transistors M54 to M56 of which the gate is connected to a clip control signal φclip. It is to cause the potentials of the vertical signal lines V1 to V3 not to fall below an output level corresponding to the clip voltage input terminal Vclip.

An operation of the solid-state imaging apparatus shown in FIG. 1 will now be described. A case is supposed here that a first row from the upper side of the pixel section 2 is selected by the vertical scanning section 3 and that an intense light is incident on the pixel Pixel21 while light is scarcely incident on the pixels Pixel11 and Pixel31. Since the pixels Pixel11 and Pixel31 in this case are in substantially the same condition, only the operation of the pixels Pixel11 and Pixel21 will be described. At first when light is incident on the photodiodes PD11 and PD21, photoelectric charges are accumulated at the photodiodes PD11 and PD21. Since the first row from the upper side of the pixel section 2 is being selected by the vertical scanning section 3, the select transistors M411 and M421 are turned ON as the row select signal φSEL1 attains H level so that the amplification transistor M311 and the vertical signal line V1, and the amplification transistor M321 and the vertical signal line V2 are respectively connected whereby pixel signals of the pixels of the first row are read out. Further, due to H level of the clip control signal φclip at the clip section 5, the clip select transistors M54 to M56 are also turned ON so that the clip transistor M51 is connected to the vertical signal line V1 and the clip transistor M52 to the vertical signal line V2, respectively. Here, the amplification transistor M311 and the clip transistor M51 as well as the amplification transistor M321 and the clip transistor M52 constitute a differential input construction where their sources are connected in common.

In this case, when light is scarcely incident on the pixel Pixel11 so that a light signal potential Vsig(FD11) of the floating diffusion FD11, i.e. the gate potential of the amplification transistor M311 is higher than the clip voltage Vclip that is the gate potential of the clip transistor M51, the clip transistor M51 is turned OFF and an output level corresponding to the light signal potential Vsig(FD11) of the floating diffusion FD11 is obtained on the vertical signal line V1. At this time, the output level of the vertical signal line V1 is an output level with which the bias current transistor M41 operates in a saturation region.

In the case where an intense light is incident on the pixel Pixel21 so that a light signal potential Vsig(FD21) of the floating diffusion FD21, i.e. the gate potential of the amplification transistor M321 is lower than the clip voltage Vclip that is the gate potential of the clip transistor M52, on the other hand, the amplification transistor M321 is turned OFF. The vertical signal line V2 then attains an output level corresponding to the clip voltage Vclip which is applied on the gate of the clip transistor M52 and does not fall below [Vclip−VGS(M52)]. Here, VGS(M52) is a gate-source voltage of the clip transistor M52. At this time, by setting the clip voltage Vclip to a suitable value, the bias current transistor M42 always operates in a saturation region so that the bias current Ibias is kept at a constant level.

As the above, since the vertical signal line V2 does not fall below an output level corresponding to the clip voltage input terminal Vclip even when the intense light is incident on the pixel Pixel21, the change in the output current Ibias of the bias current transistor M42 is suppressed so that the white transverse stripe does not occur.

SUMMARY OF THE INVENTION

In a first aspect of the invention, there is provided a solid-state imaging apparatus including: a pixel section having pixels two-dimensionally arranged into rows and columns each pixel containing a photoelectric conversion means, an amplification means for amplifying and outputting as pixel signal a signal electric charge of the photoelectric conversion means, and a reset means for resetting signal electric charges accumulated at the amplification means; a vertical scanning section for selecting a row to be read out of the pixel section; a vertical signal line provided column by column for outputting the signal from the pixel section; and a sample-and-hold type bias section connected to the vertical signal line containing at least a hold means for setting an electric current flowing into the amplification means. The sample-and-hold type bias section causes to generate an electric current corresponding to a voltage set at the hold means when signal electric charges accumulated at the photoelectric conversion means is read out from the amplification means.

In a second aspect of the invention, the hold means of the sample-and-hold type bias section in the solid-state imaging apparatus according to the first aspect has a capacitor means.

In a third aspect of the invention, the sample-and-hold type bias section in the solid-state imaging apparatus according to the second aspect includes: a first reference voltage; a sampling means having a first terminal connected to the first reference voltage; the capacitor means having a first terminal connected to a second terminal of the sampling means; and a transistor having a gate connected to the first terminal of the capacitor means, a source connected to a second reference voltage, and a drain serving as a bias current output terminal. A second terminal of the capacitor means is connected to the source of the transistor or to the second reference voltage, and when the signal electric charges accumulated at the photoelectric conversion means is read out from the amplification means, a drain current of the transistor is determined in accordance with a potential difference between the first and second terminals of the capacitor means.

In a fourth aspect of the invention, the sample-and-hold type bias section in the solid-state imaging apparatus according to the second aspect includes: a first reference voltage; a sampling means having a first terminal connected to the first reference voltage; the capacitor means having a first terminal connected to a second terminal of the sampling means; and a transistor having a gate connected to the first terminal of the capacitor means, a source connected through a resistor means to a second reference voltage, and a drain serving as a bias current output terminal. A second terminal of the capacitor means is connected to a vicinity of connecting point between the resistor means and the second reference voltage, and when the signal electric charges accumulated at the photoelectric conversion means is read out from the amplification means, a drain current of the transistor is determined in accordance with a potential difference between the first and second terminals of the capacitor means.

In a fifth aspect of the invention, the sample-and-hold type bias section in the solid-state imaging apparatus according to the third or fourth aspect effects a sampling operation connecting between the first reference voltage and the capacitor means by the sampling means every time when the row to be read out changes.

In a sixth aspect of the invention, the sample-and-hold type bias section in the solid-state imaging apparatus according to any one of the third to fifth aspects ends a sampling operation connecting between the first reference voltage and the capacitor means by the sampling means after resetting of the signal electric charges inputted to the amplification means is ended.

In a seventh aspect of the invention, the sample-and-hold type bias section in the solid-state imaging apparatus according to the third or fourth aspect effects a sampling operation connecting between the first reference voltage and the capacitor means by the sampling means when a read operation of a plurality of rows is ended.

In an eighth aspect of the invention, there is provided a solid-state imaging apparatus including: a pixel section having pixels two-dimensionally arranged into rows and columns each pixel containing a photoelectric conversion means, an amplification means for amplifying and outputting as pixel signal a signal electric charge of the photoelectric conversion means, and a reset means for resetting signal electric charges accumulated at the amplification means; a vertical scanning section for selecting a row to be read out of the pixel section; a vertical signal line provided column by column for outputting the signal from the pixel section; and a DMOS type bias section connected to the vertical signal line having DMOS (depletion type MOS) transistor for setting a bias current flowing into the amplification means. The DMOS type bias section sets the bias current for the amplification means to be smaller than a bias current at the time of resetting the amplification means when reading from the amplification means the signal electric charges accumulated at the photoelectric conversion means.

In a ninth aspect of the invention, the DMOS type bias section in the solid-state imaging apparatus according to the eighth aspect has a switch means for switching a connecting point of the gate of the DMOS transistor to a first reference voltage or to a source side wiring of the DMOS transistor so as to change the connecting point of the gate of the DMOS transistor from the first reference voltage to the source side wiring with using the switch means after resetting of the signal electric charges inputted to the amplification means is ended so that the bias current for the amplification means is smaller when the gate of the DMOS transistor is connected to the source side wiring.

In a tenth aspect of the invention, the DMOS type bias section in the solid-state imaging apparatus according to the eighth aspect has a plurality of parallel-connected DMOS transistors respectively connected at gates and source side wrings to each of the vertical signal lines so that the number of connected ones of the DMOS transistors is reduced after resetting of signal electric charges inputted to the amplification means is ended.

In an eleventh aspect of the invention, the DMOS type bias section in the solid-state imaging apparatus according to any one of the eighth to tenth aspects further includes a second switch means for controlling a connection to each of the vertical signal lines so as to OFF a bias current in periods where it is unnecessary.

BRIEF DESCRIPTION OF THE DRAWINGS

FIG. 10 is a drive timing chart for explaining operation of the third embodiment.

FIGS. 11A and 11B each is a drive timing chart showing another example of sampling operation of the sample-and-hold type bias section in the third embodiment.

DESCRIPTION OF THE PREFERRED EMBODIMENTS

Some embodiments of the solid-state imaging apparatus according to the invention will be described below with reference to the drawings.

Embodiment 1

Figure 2:
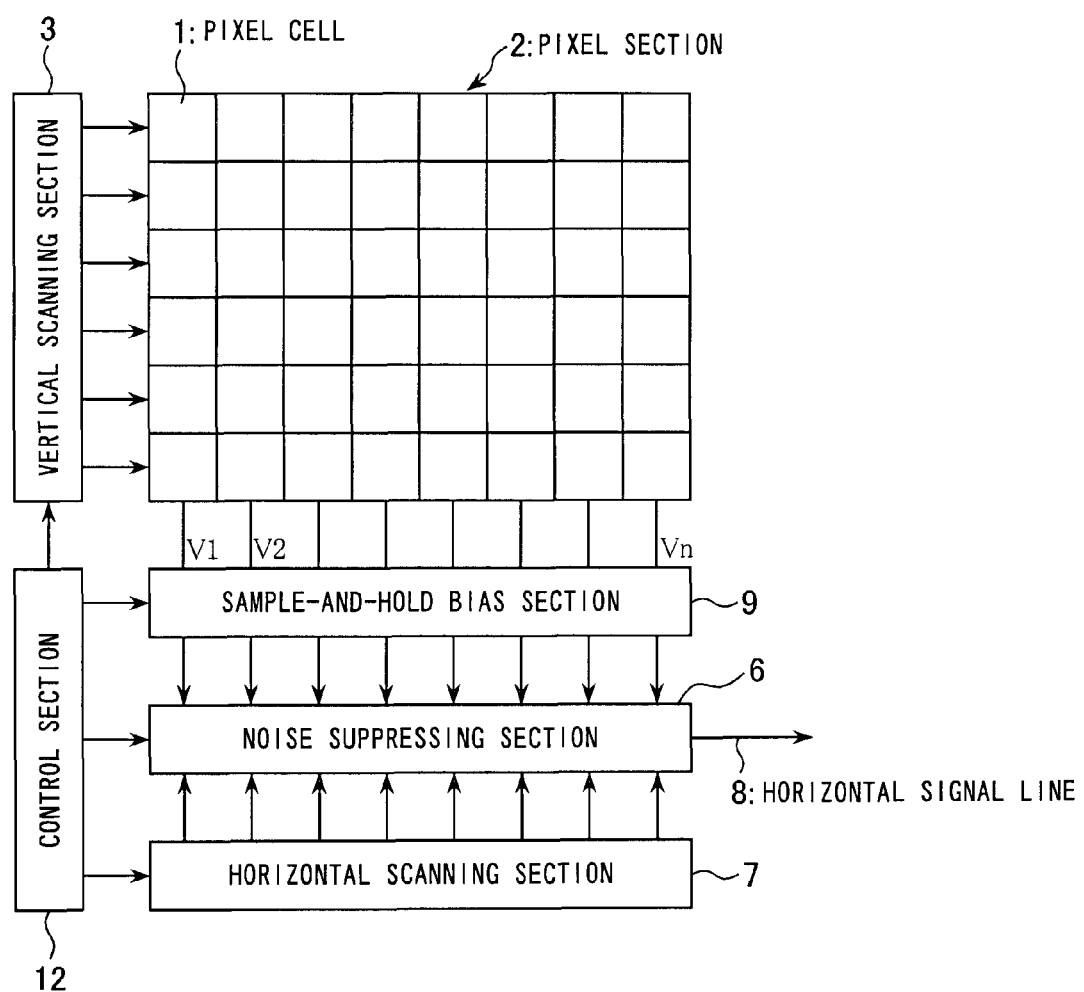
FIG. 2. is a block diagram schematically showing construction of a first embodiment of the solid-state imaging apparatus according to the invention.

A first embodiment of the solid-state imaging apparatus using an amplified MOS sensor according to the invention will now be described with reference to the drawings. FIG. 2 is a block diagram schematically showing construction of the solid-state imaging apparatus using amplified MOS sensor according to the first embodiment. The solid-state imaging apparatus according to this embodiment includes: a pixel section 2 having pixel cells 1 two-dimensionally arranged into rows and columns; a vertical scanning section 3 for selecting row to be read out of the pixel section 2; vertical signal lines V1 to Vn for outputting pixel signal by the unit of column from the pixel section 2; a sample-and-hold type bias section 9 connected to the vertical signal lines V1 to Vn for supplying a bias current to the pixel section 2; a noise suppressing section 6 for suppressing a noise of the pixel signals outputted onto the vertical signal lines V1 to Vn; a horizontal scanning section 7 for selecting a column to be read out of the noise suppressing section 6; a horizontal signal line 8 for outputting a signal of the noise suppressing section 6; and a control section 12 for controlling the vertical scanning section 3, the sample-and-hold type bias section 9, the noise suppressing section 6, and the horizontal scanning section 7.

Figure 1:
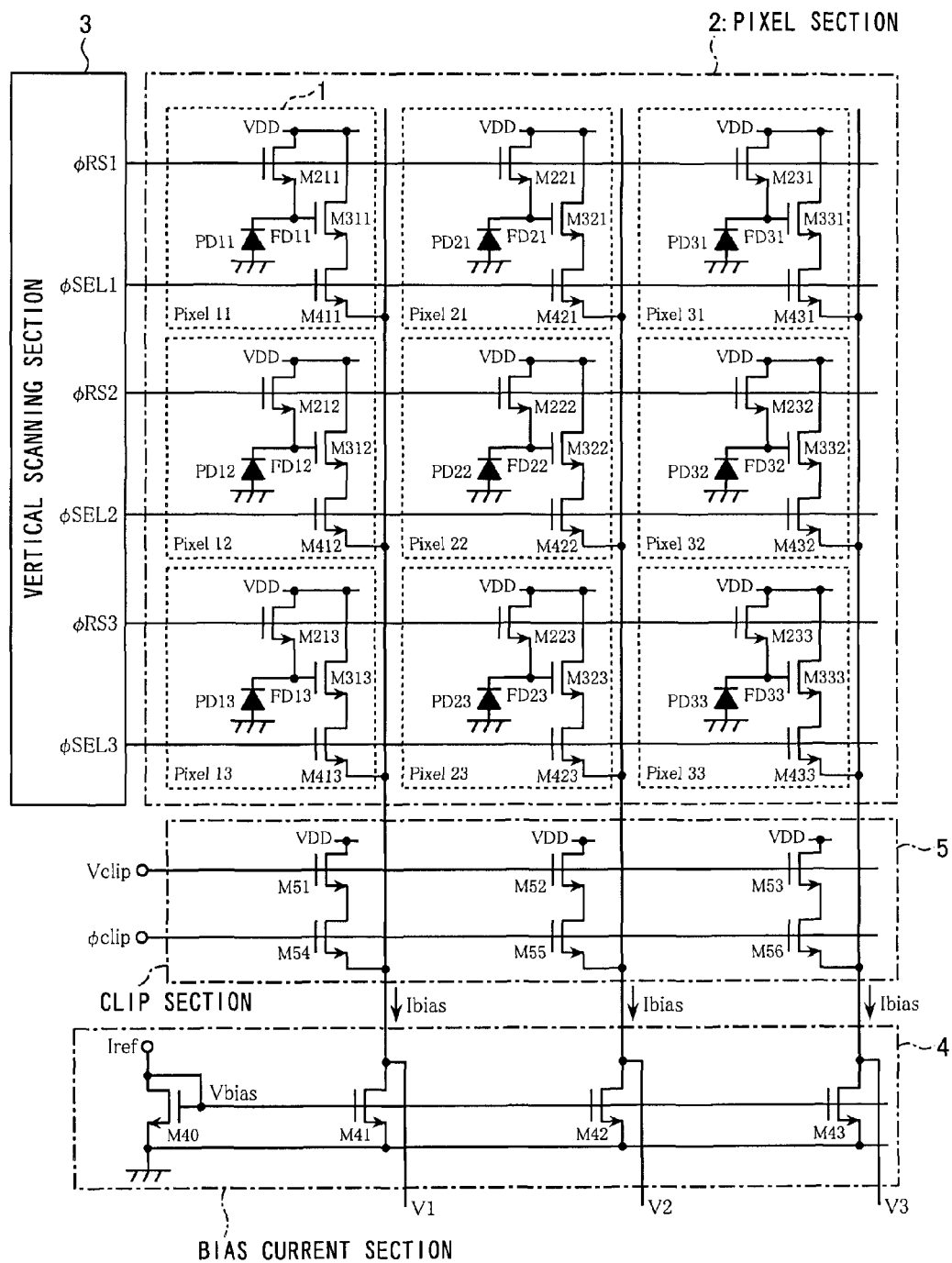
FIG. 1 is a circuit diagram showing construction of a prior-art solid-state imaging apparatus.
Figure 3:
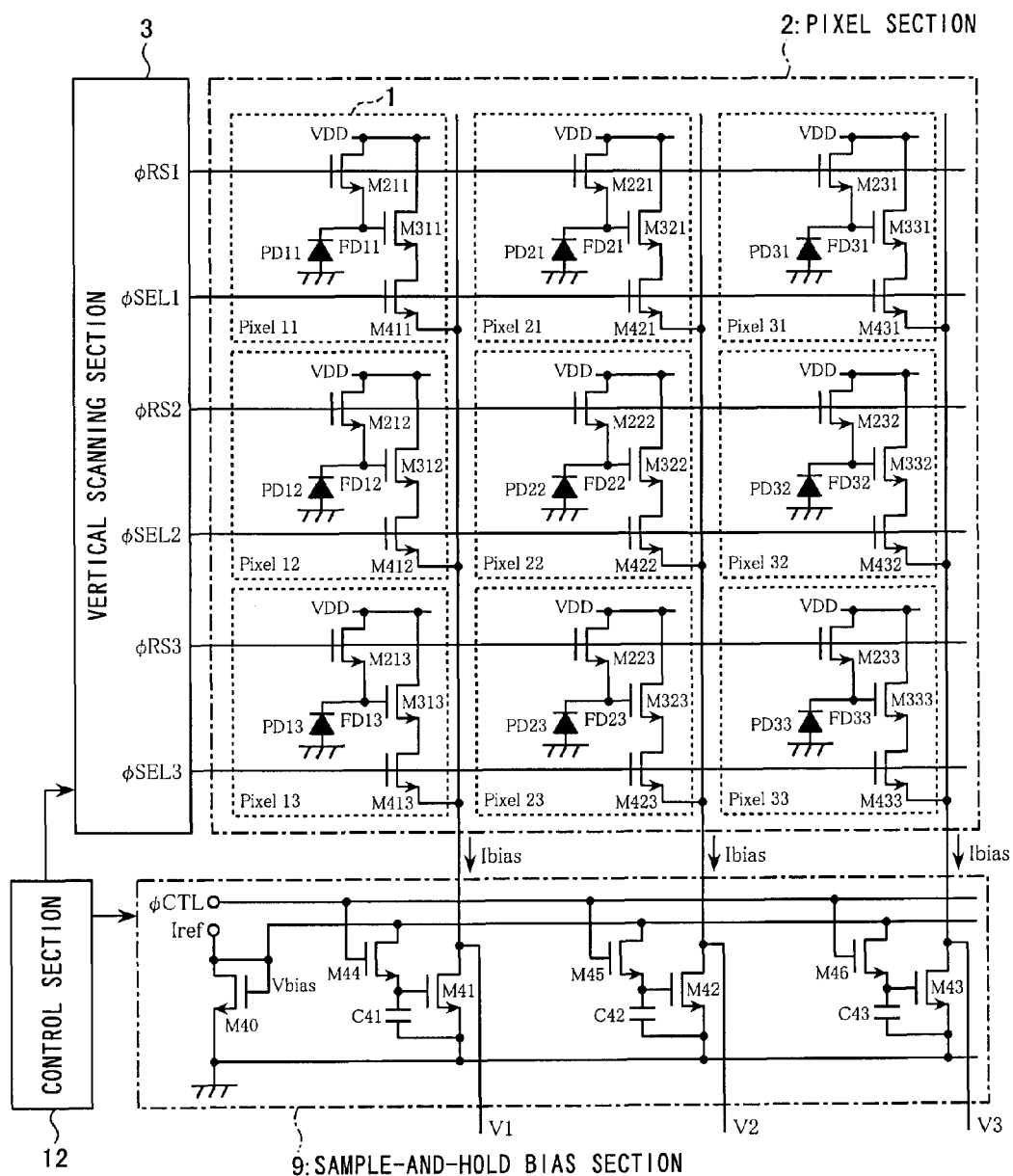
FIG. 3 is a circuit diagram showing construction of a portion corresponding to the pixel section, the vertical scanning section, the sample-and-hold type bias section and the vertical signal line in the first embodiment shown in FIG. 2.

FIG. 3 is a circuit diagram specifically showing a construction of the pixel section 2, the vertical scanning section 3, the sample-and-hold type bias section 9, and the vertical signal lines V1 to V3 in the first embodiment shown in the block diagram of FIG. 2. Like components as those in the prior-art example shown in FIG. 1 are denoted by like reference symbols. The portion of the circuit construction shown in FIG. 3 includes: a pixel section 2 where pixel cells 1 are disposed into rows and columns so as to result a 3-row by 3-column arrangement; a vertical scanning section 3 for selecting row to be read out of the pixel section 2; vertical signal lines V1 to V3 for outputting pixel signals by the unit of column from the pixel section 2; and the sample-and-hold type bias section 9 connected to the vertical signal lines V1 to V3 for supplying a bias current to the pixel section 2.

The construction of the pixel cell 1, the pixel section 2, and the vertical scanning section 3 is similar to the prior-art example shown in FIG. 1 and will not be described. The sample-and-hold type bias section 9 includes: a reference current input terminal Iref; a current setting input transistor M40 having gate and drain connected to each other; transistors for bias current M41 to M43; hold capacitors C41 to C43 connected between the gate and the source of the bias current transistors M41 to M43; and sampling transistors M44 to M46 for setting a bias setting voltage Vbias on the hold capacitors C41 to C43. The operation of the sampling transistors M44 to M46 is effected by a bias sampling control signal φ CTL.

Figure 4:
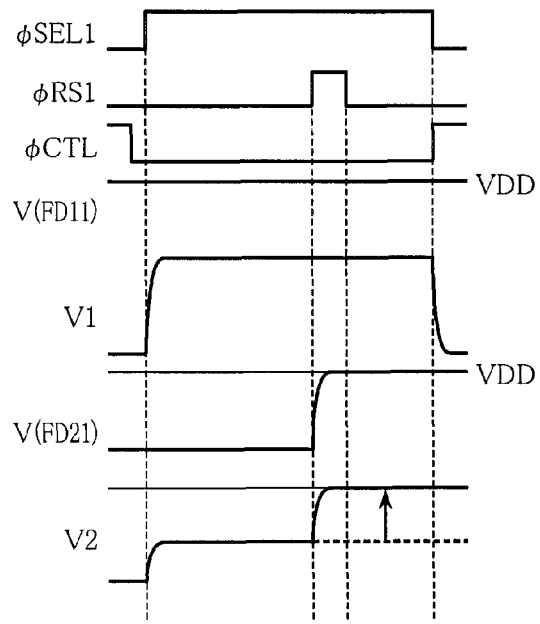
FIG. 4 is a drive timing chart for explaining operation of the first embodiment.

FIG. 4 schematically shows a drive timing of the first embodiment when the sample-and-hold type bias section 9 shown in FIG. 3 is used. The operation will be described below of a case where a first pixel row from the upper side of the pixel section 2 is selected by the vertical scanning section 3, and an intense light is incident only on the pixel Pixel21 while light is scarcely incident on the pixels Pixel11 and Pixel31. Since, in this case, the conditions of the pixels Pixel11 and Pixel31 are substantially the same, the operation of the pixels Pixel11 and Pixel21 will be described. Initially, light signal outputs accumulated at the photodiodes PD11 and PD12 of the pixels Pixel11 and Pixel21 are obtained. At first, by bringing to L level the bias sampling control signal φ CTL which has previously been set at H level, the sampling transistors M44 and M45 are turned OFF to thereby hold the bias setting voltage Vbias at the hold capacitors C41 and C42. A bias current Ibias is thereby generated corresponding to the voltage difference between the two ends of the hold capacitors C41 and C42 which is connected between the gate and source of the bias current transistors M41 and M42. Subsequently, the row select transistors M411 and M421 are turned ON by driving the row select control signal φ SEL1 to H level so as to connect the first row pixels Pixel11 and Pixel21 respectively to the vertical signal lines V1 and V2.

A light signal potential Vsig(FD11) of the floating diffusion FD11 of the pixel Pixel11 on which the light is hardly incident attains a pixel power supply potential VDD that is a reset level. Accordingly, a light signal potential Vsig(V1) on the vertical signal line V1 is obtained as in the following equation (1).

$$Vsig(V1)=Vsig(FD11)-VGS(M311)=VDD-VGS(M311) \quad (1)$$

where VGS(M311) is a gate-source voltage of the amplification transistor M311 when a bias current Ibias flows into the amplification transistor M311.

A significant potential change Δ V occurs, on the other hand, of a light signal potential Vsig(FD21) of the floating diffusion FD21 of the pixel Pixel21 on which the intense light is incident, and its potential Vsig(FD21) falls substantially to a ground level. For this reason, the amplification transistor M321 is turned OFF and, as shown in the following equation (2), a light signal potential Vsig(V2) on the vertical signal line V2 attains the ground level.

$$Vsig(V2)=0 \quad (2)$$

Since the bias current transistor M42 is thereby turned OFF, a current value flowing onto a ground wiring to which the source of the bias current transistor M41 is connected changes. A source potential of the bias current transistor M41 is then also changed due to the effect of resistance component that occurs on the ground wiring. The bias current Ibias of the bias current transistor M41 however is not affected by the change in the source potential, since it is determined by the potential difference between the two ends of the hold capacitor C41 which is connected between its source and gate. In other words, since the gate-side potential of the hold capacitor C41 changes in accordance with change in the source-side potential, the voltage difference between the two ends or the source-side terminal and the gate-side terminal of the hold capacitor C41 attains a constant value. For this reason, the light signal potential Vsig(V1) on the vertical signal line V1 of the pixel Pixel11 on which light is hardly incident does not change even when the intense light is incident on the pixel Pixel21. At this time, the light signal potentials Vsig(V1) and Vsig(V2) on the vertical signal lines V1 and V2 are respectively temporarily stored at the noise suppressing section 6.

Next, reset outputs at the time of resetting accumulated electric charges at the photodiodes PD11 and PD12 are obtained from the pixels Pixel11 and Pixel21. At first, in the condition where the first row pixels Pixel11 and Pixel21 are respectively connected to the vertical signal lines V1 and V2 with maintaining the row select control signal φ SEL1 at H level, the reset signal φ RS1 is driven to H level to turn ON the reset transistors M211 and M221. The electric charges accumulated at the photodiodes PD11 and PD21 are thereby reset and at the same time the floating diffusions FD11 and FD21 are reset to the pixel power supply voltage VDD.

Subsequently, the reset transistors M211 and M221 are turned OFF by returning the reset signal φ RS1 to L level so as to bring the floating diffusions FD11 and FD21 into high impedance state. At this time, of the pixel Pixel11 where light is hardly incident and of the pixel Pixel21 where the intense light is incident, the reset signal potentials Vres(FD11) and Vres(FD21) of the floating diffusions FD11 and FD21 both attain the pixel power supply potential VDD. Accordingly, the reset signal potentials Vres(V1) and Vres(V2) on the vertical signal lines V1 and V2 are respectively obtained as in the following equations (3), (4).

$$Vres(V1)=Vres(FD11)-VGS(M311)=VDD-VGS(M311) \quad (3)$$

$$Vres(V2)=Vres(FD21)-VGS(M321)=VDD-VGS(M321) \quad (4)$$

where VGS(M321) is a gate-source voltage of the amplification transistor M321 when the bias current Ibias flows into the amplification transistor M321. These reset signal potentials Vres(V1) and Vres(V2) on the vertical signal lines V1 and V2 are respectively subjected to differential processing with light signal potentials at the noise suppressing section 6 so that difference signal outputs Vsub(V1) and Vsub(V2) corresponding to incident light are respectively obtained as in the following equations (5), (6).

$$Vsub(V1)=Vres(V1)-Vsig(V1)=0 \quad (5)$$

$$Vsub(V2)=Vres(V2)-Vsig(V2)=VDD-VGS(M321) \quad (6)$$

As is apparent from equation (5), even when an intense light is incident on the pixel Pixel21 so that an output level on the vertical signal line V2 attains that of the ground, an occurrence of the white transverse stripe can be suppressed because the bias current of the bias current transistor M41 is a constant value Ibias. Subsequently, the row select transistors M411 and M421 are turned OFF by bringing the row select control signal φ SELL to L level so as to disconnect the first row pixels Pixel11 and Pixel21 respectively from the vertical signal lines V1 and V2. At the same time, the bias sampling control signal φ CTL is driven to H level so as to make the bias setting voltage Vbias be sampled again at the hold capacitors C41 and C42.

Thus with the present embodiment, even when an output level of the vertical signal line of a pixel column on which an intense light is incident attains a ground level, an occurrence of the white transverse stripe can be suppressed because the bias current of the other pixel columns does not change. In addition, since the output level of the vertical signal line can be lowered to the ground level, it is also possible to meet a lowering in voltage of the pixel power supply voltage VDD.

Figure 5:
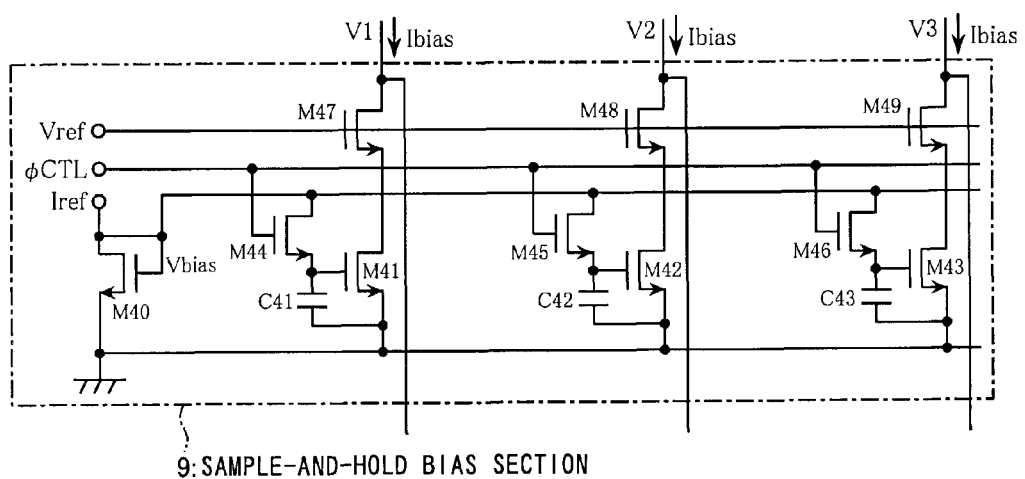
FIG. 5 is a circuit diagram showing a modification of the sample-and-hold type bias section in the first embodiment shown in FIG. 3.
Figures 6A, 6B:
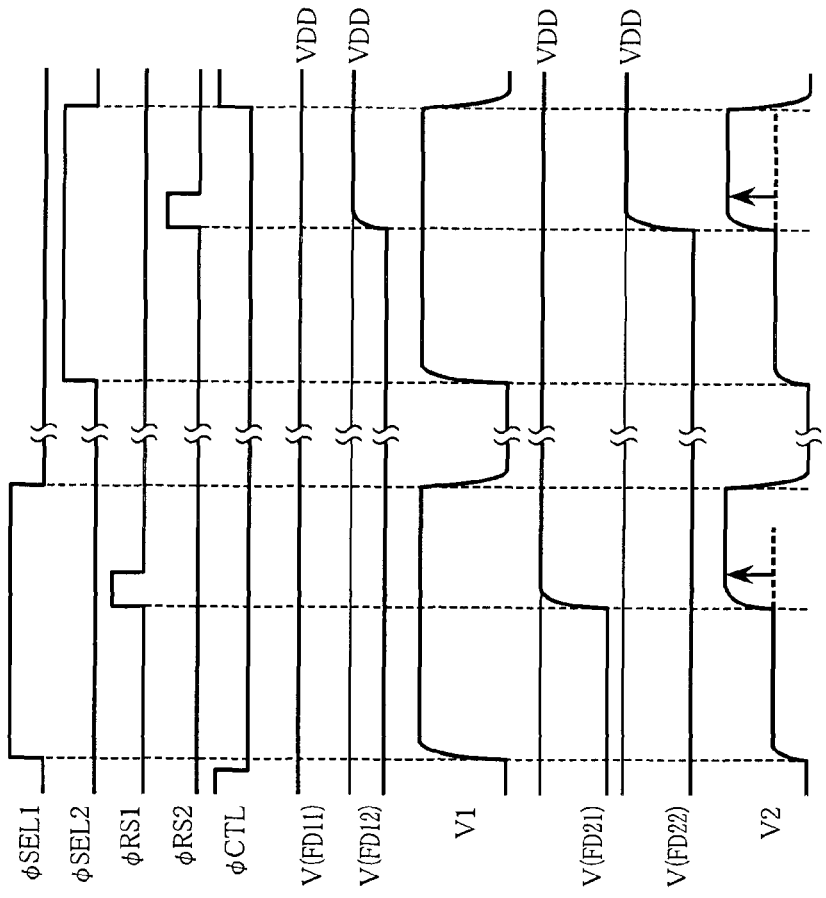
FIGS. 6A and 6B each is a drive timing chart showing another example of sampling operation at the sample-and-hold type bias section in the first embodiment.

It is to be noted that various modifications of the present embodiment are possible. For example, a cascode type circuit as shown in Fig.5 can also be used as the sample-and-hold type bias section 9. In the modification shown in Fig.5, transistors for cascode M47 to M49 having gate connected to the reference voltage input terminal Vref are connected to the drain side of the bias current transistors M41 to M43 in the sample-and-hold type bias section 9 shown in Fig.3. The bias current Ibias is then supplied onto the vertical signal lines V1 to V3 through the cascade transistors M47 to M49. An output resistance from the drain side of the cascode transistor M47 to M49 is thereby increased so that a constant current characteristic of the bias current Ibias is improved. Further in the present embodiment, as shown in a timing chart of Fig.6A, the sampling operation by the bias sampling control signal φ CTL at the sample-and-hold bias section 9 may be effected in a period outside that of light signal output. Furthermore, as shown in a timing chart of Fig.63, it is also possible that one sampling operation at the sample-and-hold type bias section 9 be effected when a plurality of rows are read out.

Embodiment 2

Figure 7:
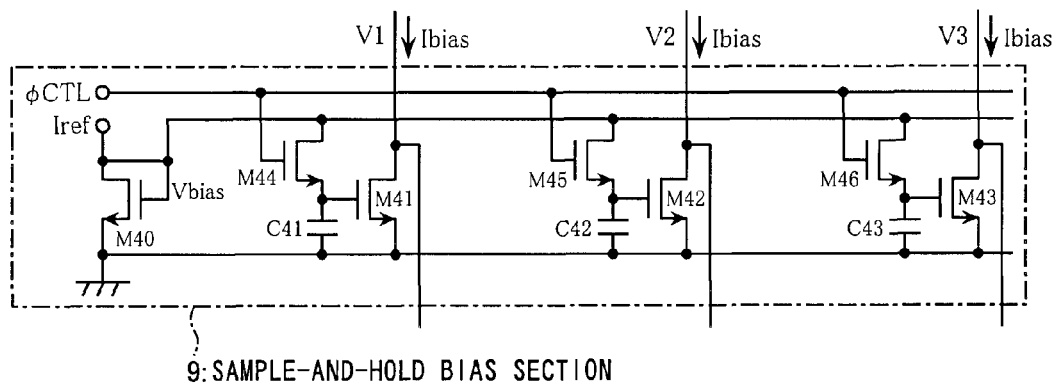
FIG. 7 is a circuit diagram showing construction of the sample-and-hold type bias section in a second embodiment.

A second embodiment of the invention will now be described. FIG. 7 shows the construction of a main portion in the solid-state imaging apparatus using amplified MOS sensor according to the second embodiment where connecting points of the hold capacitors C41 to C43 contained in the sample-and-hold type bias section 9 in the first embodiment are changed. In particular, with the sample-and-hold type bias section 9 of the present embodiment, one end of the hold capacitor C41 to C43 is respectively connected to the gate of the bias current transistor M41 to M43, and the other end of the hold capacitor C41 to C43 is connected to the vicinity of a ground wiring into which the bias current Ibias of the bias current transistor M41 to M43 is caused to flow.

Figure 8:
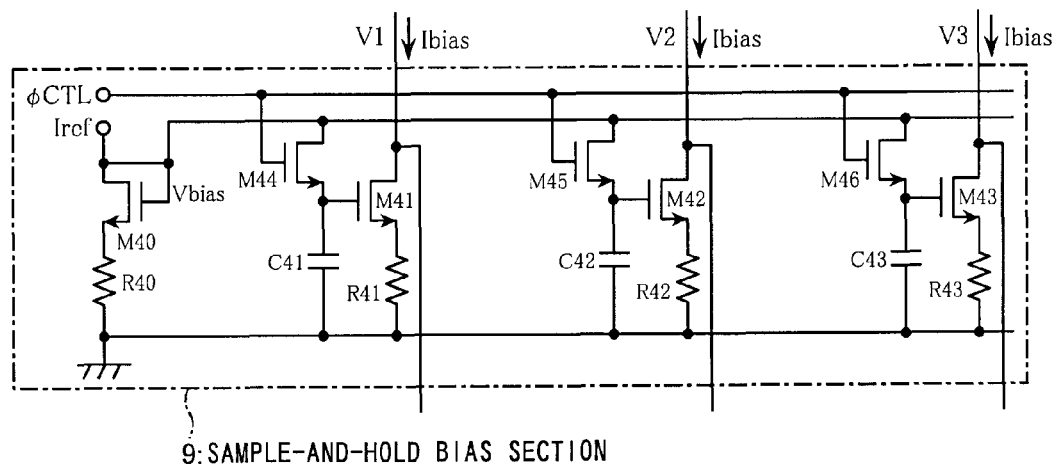
FIG. 8 is a circuit diagram showing a modification of the sample-and-hold type bias section in the second embodiment shown in FIG. 7.

Although an explanation of operation of the present embodiment is omitted as it is similar to the first embodiment, similar advantages are obtained. It is to be noted that various modifications are possible of the present embodiment. For example, a bias circuit using source resistance as shown in FIG. 8 may be used as the sample-and-hold type bias section 9. In the sample-and-hold type bias section 9 shown in FIG. 8, a source resistance R40 is connected to the source side of the bias current setting input transistor M40, and source resistances R41 to R43 are respectively connected to the source side of the bias current transistors M41 to M43. An output resistance as seen from the drain of the bias current transistor M41 to M43 is thereby increased so that a constant current characteristic of the bias current Ibias is improved. Similar advantages are obtained also with such a bias circuit having source resistance.

Thus with the present embodiment, even when an output level of the vertical signal line of a pixel column on which an intense light is incident attains a ground level, an occurrence of the white transverse stripe can be suppressed because the bias current of the other pixel columns does not change. In addition, since the output level of the vertical signal line can be lowered to the ground level, it is also possible to meet a lowering in voltage of the pixel power supply voltage VDD. Furthermore, it is applicable to a greater number of types of bias circuits.

Embodiment 3

Figure 9:
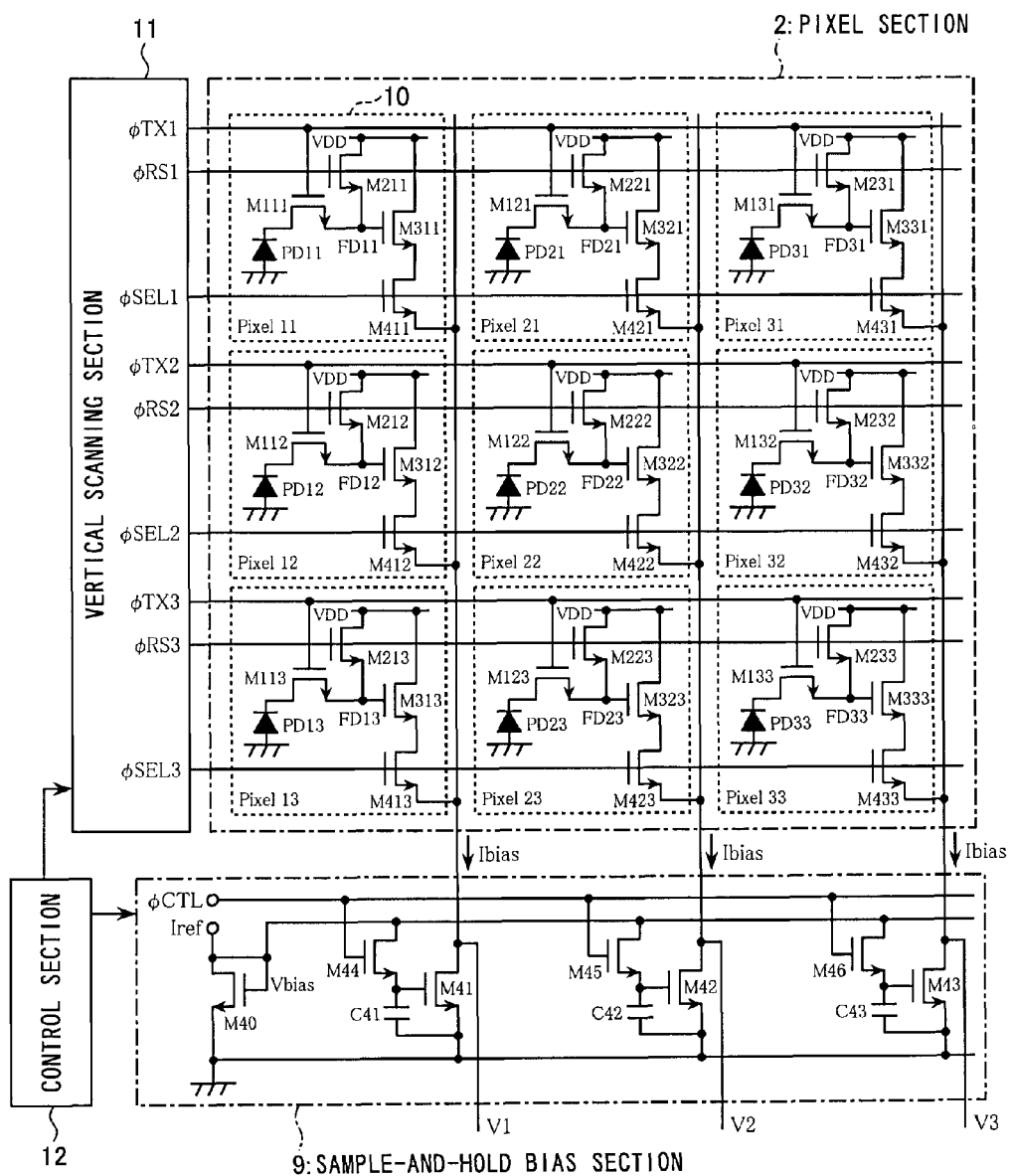
FIG. 9 is a circuit diagram showing construction of a third embodiment.

A third embodiment of the invention will now be described. FIG. 9 is a circuit diagram showing construction of the solid-state imaging apparatus using amplified MOS sensor according to the third embodiment where the construction of the pixel cell and the vertical scanning section in the first embodiment is changed. In the circuit diagram shown in FIG. 9, like components as in the first embodiment shown in FIG. 3 are denoted by like reference symbols. A pixel cell 10 in this embodiment includes: a photodiode PD11 that is a photoelectric conversion section; a floating diffusion FD11 for converting electric charges accumulated at the photodiode PD11 into a voltage; a transfer transistor M111 for transferring electric charges from the photodiode PD11 to the floating diffusion FD11; a reset transistor M211 for resetting the floating diffusion FD11; an amplification transistor M311 for amplifying the voltage of the floating diffusion FD11; and a row select transistor M411 for selecting the pixel cells of each row.

The pixel section 2 in this case is constructed by arranging the pixel cells 10 into 3 rows by 3 columns. The vertical scanning section 11 outputs: transfer control signals φ TX1 to φ TX3 for controlling operation of the transfer transistors M111 to M133; reset control signals φ RS1 to φ RS3 for controlling operation of the reset transistors M211 to M233; and row select control signals φ SELL to φ SEL3 for controlling operation of the row select transistors M411 to M433.

FIG. 10 schematically shows drive timing for explaining operation of the sample-and-hold type bias section 9. Shown here is the operation of a case where a first pixel row from the upper side of the pixel section 2 is selected by the vertical scanning section 11, and an intense light is incident only on the pixel Pixel21 while light is scarcely incident on the pixels Pixel11 and Pixel31. Since the conditions of the pixels Pixel11 and Pixel31 are substantially the same, the operation of the pixels Pixel11 and Pixel21 will be described.

Initially, reset outputs at the time of resetting the floating diffusions FD11 and FD21 are obtained from the pixels Pixel11 and Pixel21. At first, by bringing to L level the bias sampling control signal φ CTL which has previously been set at H level, the sampling transistors M44 and M45 are turned OFF to thereby hold the bias setting voltage Vbias at the hold capacitors C41 to C42. Thereby, bias currents Ibias are respectively generated corresponding to the voltage differences between the two ends of the hold capacitors C41 and C42 which are connected between the gate and source of the bias current transistors M41 and M42. Subsequently, the row select transistors M411 and M412 are turned ON by driving the row select control signal φ SEL1 to H level so as to connect the first row pixels Pixel11 and Pixel21 respectively to the vertical signal lines V1 and V2. The reset transistors M211 and M221 are then turned ON by driving the reset signal φ RS1 to H level to thereby reset the floating diffusions FD11 and FD21 to the pixel power supply voltage VDD.

Subsequently, the reset transistors M211 and M221 are turned OFF by returning the reset signal φ RS1 to L level so as to bring the floating diffusions FD11 and FD21 into high impedance state. At this time, of the pixel Pixel11 where light is scarcely incident and of the pixel Pixel21 where an intense light is incident, the reset signal potentials Vres(FD11) and Vres(FD21) of the floating diffusions FD11 and FD21 both attain the pixel power supply potential VDD. Accordingly, the reset signal potentials Vres(V1) and Vres(V2) on the vertical signal lines V1 and V2 are respectively obtained as in the following equations (7) (8).

$$Vres(V1)=Vres(FD11)-VGS(M311)=VDD-VGS(M311) \quad (7)$$

$$Vres(V2)=Vres(FD21)-VGS(M321)=VDD-VGS(M321) \quad (8)$$

Here, VGS(M311) is a gate-source voltage of the amplification transistor M311 when the bias current Ibias flows into the amplification transistor M311 and VGS(M321) is a gate-source voltage of the amplification transistor M321 when the bias current Ibias flows into the amplification transistor M321. At this time, the reset signal potentials Vres(V1) and Vres(V2) on the vertical signal lines V1 and V2 are temporarily stored at the noise suppressing section 6.

Next, light signal outputs accumulated respectively at the photodiodes PD11 and PD12 of the pixels Pixel11 and Pixel21 are obtained. At first, in the condition where the first row pixels Pixel11 and Pixel21 are connected respectively to the vertical signal lines V1 and V2 with continuing H level of the row select control signal φ SEL1, the transfer transistors M111 and M121 are turned ON by driving the transfer control signal φ TX1 to H level to thereby transfer electric charges accumulated at the photodiodes PD11 and PD12 to the floating diffusions FD11 and FD21. Subsequently, the transfer transistors M111 and M121 are turned OFF by bringing the transfer control signal φ TX1 back to L level. At this time, since L level of the bias sampling signal φ CTL is continued, the bias current transistors M41 and M42 continue to generate the bias current Ibias.

A light signal potential Vsig(FD11) at the floating diffusion FD11 of the pixel Pixel11 on which light is scarcely incident attains a pixel power supply potential VDD that is a reset level. Accordingly, a light signal potential Vsig(V1) on the vertical signal line V1 is obtained as in the following equation (9).

$$Vsig(V1)=Vsig(FD11)-VGS(M311)=VDD-VGS(M311) \quad (9)$$

where VGS(M311) is a gate-source voltage of the amplification transistor M311 when a bias current Ibias flows into the amplification transistor M311.

A significant potential change ΔV occurs and it falls substantially to a ground level, on the other hand, of a light signal potential Vsig(FD21) at the floating diffusion FD21 of the pixel Pixel21 on which the intense light is incident. For this reason, the amplification transistor M321 is turned OFF and, as shown in the following equation (10), a light signal potential Vsig(V2) on the vertical signal line V2 attains the ground level.

$$Vsig(V2)\approx 0 \quad (10)$$

Since the bias current transistor M42 is thereby turned OFF, a current value flowing onto a ground wiring to which the source of the bias current transistor M41 is connected changes. A source potential of the bias current transistor M41 is then also changed due to the effect of resistance component that occurs on the ground wiring. The bias current Ibias of the bias current transistor M41 however is not affected by the change in the source potential, since it is determined by the potential difference between the two ends of the hold capacitor C41 which is connected between its source and gate. In other words, since the gate-side potential of the hold capacitor C41 changes in accordance with change in the source-side potential, the voltage difference between the two ends or the source-side terminal and the gate-side terminal of the hold capacitor C41 attains a constant value. For this reason, the light signal potential Vsig(V1) on the vertical signal line V1 of the pixel Pixel11 on which light is hardly incident does not change even when the intense light is incident on the pixel Pixel21.

These light signal potentials Vsig(V1) and Vsig(V2) on the vertical signal lines V1 and V2 are respectively subjected to differential processing with reset potentials at the noise suppressing section 6 so that difference signals Vsub(V1) and Vsub(V2) corresponding to incident light are obtained as shown in the following equations (11) (12).

$$Vsub(V1)=Vsig(V1)-Vres(V1)=0 \quad (11)$$

$$Vsub(V2)=Vsig(V2)-Vres(V2)=-[VDD-VGS(M321)] \quad (12)$$

As is apparent from equation (11), even when an intense light is incident on the pixel Pixel21 so that the vertical signal line V2 becomes the ground level, an occurrence of the white transverse stripe can be suppressed because the bias current of the bias current transistor M41 is a constant value Ibias. Subsequently, the row select transistors M411 and M421 are turned OFF by bringing the row select control signal φ SEL1 to L level so as to disconnect the first row pixels Pixel11 and Pixel21 respectively from the vertical signal lines V1 and V2. At the same time, the bias sampling control signal φ CTL is driven to H level so as to make the bias setting voltage Vbias be sampled again at the hold capacitors C41 and C42.

Thus with the present embodiment, even when a vertical signal line of pixel column on which an intense light is incident attains a ground level, an occurrence of the white transverse stripe can be suppressed because the bias current of the other pixel columns does not change. In addition, since the output level of the vertical signal line can be lowered to the ground level, it is also possible to meet a lowering in voltage of the pixel power supply voltage VDD.

It is to be noted that various modifications of the present embodiment are possible. For example, those modifications of the first embodiment as shown in FIG. 5 and in FIGS. 7 and 8 or the construction shown in the second embodiment may be used as the sample-and-hold type bias section 9. Further in the present embodiment, an end timing of the sampling operation at the sample-and-hold type bias section 9 may be changed from the timing shown in FIG. 10 as far as it is before the outputting of light signal. For example as shown in a timing chart of FIG. 11A, it is also possible to continue the sampling operation of the sample-and-hold type bias section 9 until immediately before a start of transfer operation by the transfer transistor. Furthermore as shown in FIG. 11B, it is also possible that one sampling operation at the sample-and-hold type bias section 9 be performed when a plurality of rows are read out.

Embodiment 4

Figure 12:
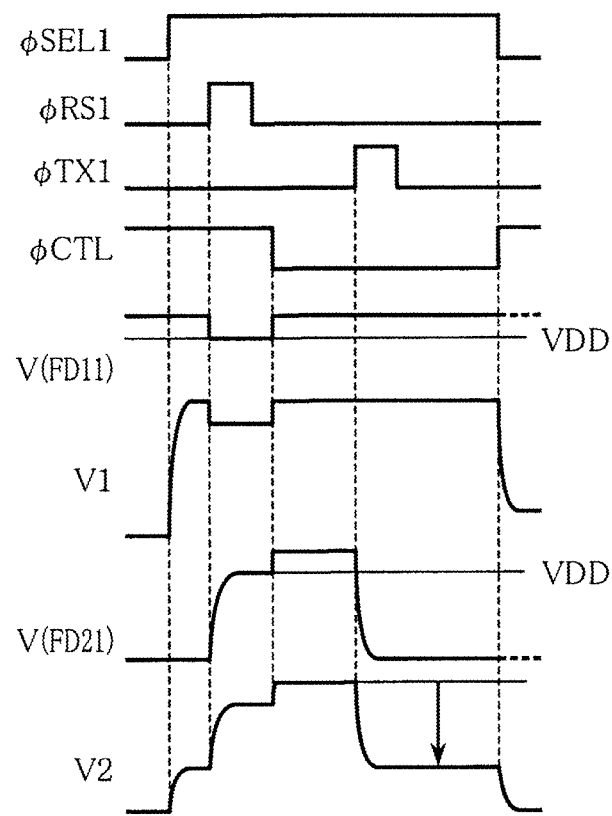
FIG. 12 is a drive timing chart for explaining operation of the solid-state imaging apparatus according to a fourth embodiment.

A fourth embodiment of the invention will now be described. The construction itself of the solid-state imaging apparatus using amplified MOS sensor according to the fourth embodiment is identical to the third embodiment shown in FIG. 9. FIG. 12 is a timing chart for explaining operation of the solid-state imaging apparatus according to the present embodiment. In the operation of the present embodiment as compared to the operation of the third embodiment, a bias current Ibias (φ CTL: L level) flowing into the bias current transistor M41 to M43 in the hold period where the bias sampling control signal φ CTL is at L level is set so that it is smaller, and the operation timing at the sample-and-hold type bias section 9 is changed. FIG. 12 schematically shows drive timing when the sample-and-hold type bias section 9 is used in the present embodiment. Shown here is the operation of a case where a first pixel row from the upper side of the pixel section 2 is selected by the vertical scanning section 11, and an intense light is incident only on the pixel Pixel21 while light is scarcely incident on the pixels Pixel11 and Pixel31. Since the conditions of the pixels Pixel11 and Pixel31 in this case are substantially the same, the operation of the pixels Pixel11 and Pixel21 will be described.

Initially, reset outputs at the time of resetting the floating diffusions FD11 and FD21 are obtained from the pixels Pixel11 and Pixel21. At first, the row select control signal φ SEL1 is driven to H level so as to connect the first row pixels Pixel11 and Pixel21 respectively to the vertical signal lines V1 and V2. Now, the sampling transistors M44 and M45 are turned ON by driving the bias sampling control signal φ CTL to H level so as to sample the bias setting voltage Vbias to the hold capacitors C41 and C42. At this time, the bias current transistors M41 and M42 respectively generate a bias current Ibias. In this condition, the reset transistors M211 and M221 are turned ON by driving the reset signal φ RS1 to H level so as to reset the floating diffusions FD11 and FD21 respectively to the pixel power supply voltage VDD.

Subsequently, the reset transistors M211 and M221 are turned OFF by returning the reset signal φ RS1 to L level so as to bring the floating diffusions FD11 and FD21 into high impedance state. The sampling transistors M44 and M45 are then turned OFF by bringing the bias sampling control signal φ CTL to L level so as to hold the bias setting voltage Vbias to the hold capacitors C41 and C42. Due to a feed-through occurring when the bias sampling control signal φ CTL applied on the gate of the sampling transistor M44 and M45 is switched from H level to L level, however, the gate-side potential of the hold capacitor C41 and C42 is lowered so that a change in bias current Δ Ibias occurs. A bias current value Ibias (φ CTL: L level) generated at the bias current transistors M41 and M42 is obtained as in the following equation (13)

$$Ibias(\phi\ CTL{:}L) = Ibias - \Delta\ Ibias \tag{13}$$

When the bias current flowing into the amplification transistors M311 and M321 is changed by Δ Ibias, the gate-source voltages VGS(M311) and VGS(M321) of the amplification transistors M311 and M321 are respectively reduced by Δ VGS(M311) and Δ VGS(M321) whereby the vertical signal lines V1 and V2 are increased respectively by Δ VGS(M311) and Δ VGS(M321). At this time, the floating diffusion FD11 in its high-impedance state is capacity-coupled to the vertical signal line V1 by the gate-source capacitance CGS(M311) of the amplification transistor M311. Due to the increase Δ VGS(M311) on the vertical signal line V1, the reset potential Vres(FD11) of the floating diffusion FD11 is obtained as in the following equations (14), (15).

$$Vres(FD11) = VDD + \Delta VGS(M311) \times \{(CGS(M311))/(C(FD11))\} \tag{14}$$

$$C(FD11) = CGS(M111) + CJ(M111) + CGS(M211) + CJ(M211) + CGD(M311) + CGS(M311) \tag{15}$$

Where C(FD11) is a total of the capacitance components occurring at the floating diffusion FD11: CGS(M111) is a gate-source capacitance of the transfer transistor M111; CJ(M111) a source junction capacitance of the transfer transistor M111; CGS(M211) a gate-source capacitance of the reset transistor M211: CJ(M211) a source junction capacitance of the reset transistor M211; and CGD(M311) a gate-drain capacitance of the amplification transistor M311.

Further, the floating diffusion FD21 is capacity-coupled to the vertical signal line V2 by the gate-source capacitance CGS(M321) of the amplification transistor M321.

Due to the increase Δ VGS(M321) on the vertical signal line V2, the reset potential Vres(FD21) of the floating diffusion FD21 is obtained as in the following equations (16), (17).

$$Vres(FD21) = VDD + \Delta VGS(M321) \times \{(CGS(M321))/(C(FD21))\} \tag{16}$$

$$C(FD21) = CGS(M121) + CJ(M121) + CGS(M221) + CJ(M221) + CGD(M321) + CGS(M321) \tag{17}$$

Here, C(FD21) is a total of the capacitance components occurring at the floating diffusion FD21: CGS(M121) is a gate-source capacitance of the transfer transistor M121; CJ(M121) a source junction capacitance of the transfer transistor M121; CGS(M221) a gate-source capacitance of the reset transistor M221: CJ(M221) a source junction capacitance of the reset transistor M221; and CGD(M321) a gate-drain capacitance of the amplification transistor M321.

Accordingly, the reset signal potentials Vres(V1) and Vres(V2) on the vertical signal lines V1 and V2 corresponding to the pixel Pixel11 on which light is scarcely incident and the pixel pixel21 on which the intense light is incident are obtained as in the following equations (18), (19).

$$\begin{aligned}Vres(V1) &= Vres(FD11) - VGS(M311) + \Delta VGS(M311)\\ &= VDD - VGS(M311) + \Delta VGS(M311) +\\ &\quad \Delta VGS(M311) \times \{CGS(M311)/C(FD11)\}\end{aligned} \tag{18}$$

$$\begin{aligned}Vres(V2) &= Vres(FD21) - VGS(M321) + \Delta VGS(M321)\\ &= VDD - VGS(M321) + \Delta VGS(M321) +\\ &\quad \Delta VGS(M321) \times \{CGS(M321)/C(FD21)\}\end{aligned} \tag{19}$$

Here: VGS(M311) is a gate-source voltage of the amplification transistor 311 when the bias current Ibias flows into the amplification transistor M311; and VGS(M321) is a gate-source voltage of the amplification transistor M321 when the bias current Ibias flows into the amplification transistor M321. At this time, the reset signal potentials Vres(V1) and Vres(V2) on the vertical signal lines V1 and V2 are temporarily stored at the noise suppressing section 6.

Next, light signal outputs accumulated at the photodiodes PD11 and PD12 of the pixels Pixel11 and Pixel21 are obtained. At first, in the condition where the first row pixels Pixel11 and Pixel21 are respectively connected to the vertical signal lines V1 and V2 with continuing H level of the row select control signal φ SEL1, the transfer control signal φ TX1 is driven to H level. The transfer transistors M111 and M121 are thereby turned ON so that the electric charges accumulated at the photodiodes PD11 and PD12 are respectively transferred to the floating diffusions FD11 and FD21. Subsequently, the transfer transistors M111 and M121 are turned OFF by bringing the transfer control signal φ TX1 back to L level. At this time, since L level of the bias sampling signal φ CTL is continued, the bias current transistors M41 and M42 continue to generate the bias current Ibias (φ CTL: L level). The light signal potential Vsig(FD11) of the floating diffusion FD11 of the pixel Pixel11 on which light is scarcely incident is obtained as in the above equation (18) that is a reset level.

A significant potential change Δ V occurs and it falls substantially to a ground level, on the other hand, of a light signal potential Vsig(FD21) at the floating diffusion FD21 of the pixel Pixel21 on which the intense light is incident. For this reason, the amplification transistor M321 is turned OFF and, as shown in the following equation (20), a light signal potential Vsig(V2) on the vertical signal line V2 attains the ground level.

$$Vsig(V2)=0 \tag{20}$$

Since the bias current transistor M42 is thereby turned OFF, the value of current flowing onto a ground wiring to which the source of the bias current transistor M41 is connected changes so that a source potential of the bias current transistor M41 is also changed due to the effect of resistance component occurring on the ground wiring. The bias current Ibias (φ CTL: L level) of the bias current transistor M41 however is not affected by the change in the source potential, since it is determined by the potential difference between the two ends of the hold capacitor C41 which is connected between its source and gate. In other words, since the gate-side potential of the hold capacitor C41 changes in accordance with change in the source-side potential, the voltage difference between the two ends or the source-side terminal and the gate-side terminal of the hold capacitor C41 attains a constant value.

For this reason, the light signal potential Vsig(V1) on the vertical signal line V1 of the pixel Pixel11 on which light is scarcely incident does not change even when an intense light is incident on the pixel Pixel21. These light signal potentials Vsig(V1) and Vsig(V2) on the vertical signal lines V1 and V2 are respectively subjected to differential processing with reset potential at the noise suppressing section 6 whereby difference signals Vsub(V1) and Vsub(V2) corresponding to incident light are obtained as shown in the following equations (21), (22).

$$Vsub(V1) = Vsig(V1) - Vres(V1) = 0 \quad (21)$$

$$Vsub(V2) = Vsig(V2) - Vres(V2) \quad (22)$$
$$= -\frac{[VDD - VGS(M321) + \Delta VGS(M321) +}{\Delta VGS(M321) \times \{CGS(M321)/C(FD21)\}]}$$

As is apparent from equation (21), even when an intense light is incident on the pixel Pixel21 so that the vertical signal line V2 attains the ground level, an occurrence of the white transverse stripe can be suppressed because the bias current of the bias current transistor M41 is a constant value Ibias (φ CTL: L level). Subsequently, the row select transistors M411 and M421 are turned OFF by bringing the row select control signal φ SEL1 to L level so as to disconnect the first row pixels Pixel11 and Pixel21 respectively from the vertical signal lines V1 and V2. At the same time, the bias sampling control signal φ CTL is driven to H level so as to make the bias setting voltage Vbias be sampled again at the hold capacitors C41 and C42.

Thus with the present embodiment, even when a vertical signal line of pixel column on which an intense light is incident attains a ground level, an occurrence of the white transverse stripe can be suppressed because the bias current of the other pixel columns does not change. In addition, since the reset potential of floating diffusion can be ascended, it is possible to meet a further lowering in voltage of the pixel power supply voltage VDD. It is to be noted that various modifications of the present embodiment are possible. For example, the types of bias circuits as shown in FIG. 5 as well as in FIGS. 7 and 8 may also be used as the sample-and-hold type bias section 9.

Embodiment 5

Figure 13:
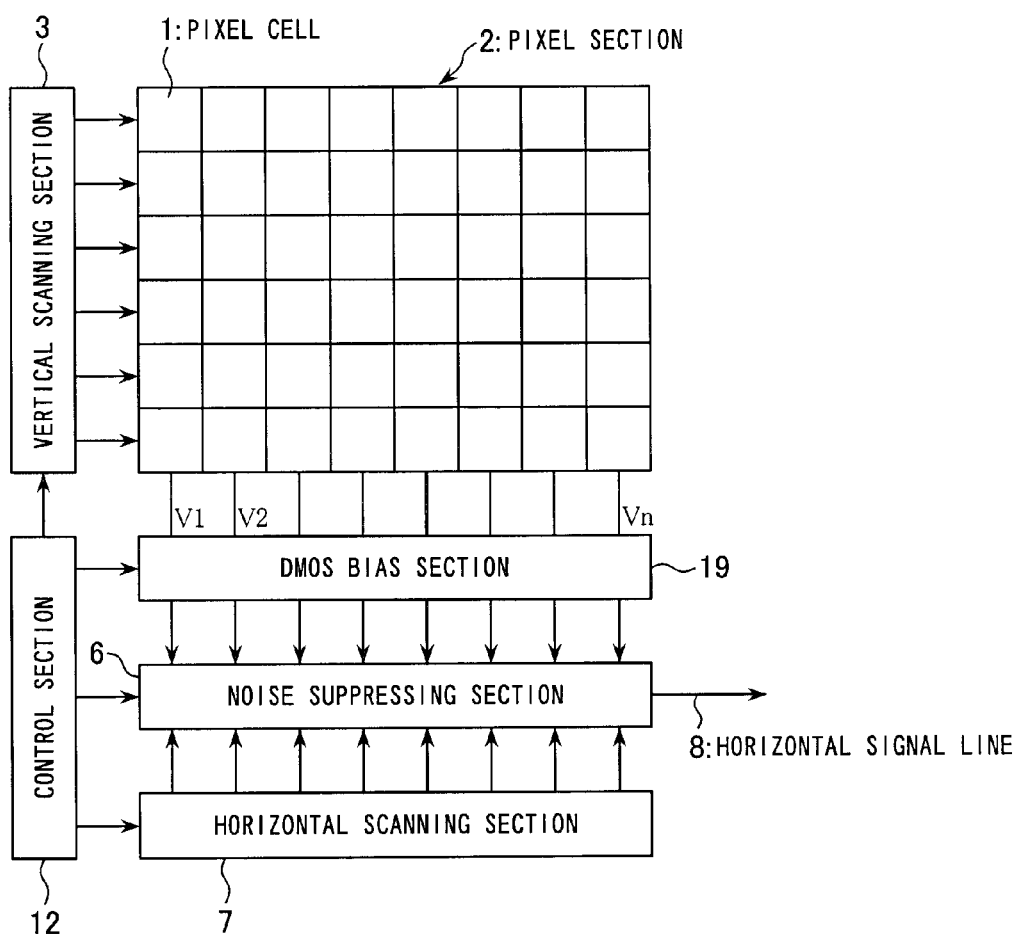
FIG. 13 is a block diagram schematically showing construction of a fifth embodiment of the solid-state imaging apparatus according to the invention.

A fifth embodiment of the invention will now be described. FIG. 13 is a block diagram schematically showing construction of the fifth embodiment of the solid-state imaging apparatus using amplified MOS sensor according to the invention. The solid-state imaging apparatus according to the present embodiment uses a DMOS (Depletion type MOS) type bias section instead of the sample-and-hold type bias section in the first embodiment shown in FIG. 2. It includes: a pixel section 2 having pixel cells 1 two-dimensionally arranged into rows and columns; a vertical scanning section 3 for selecting a row to be read out of the pixel section 2; vertical signal lines V1 to Vn for outputting pixel signal by the unit of column from the pixel section 2; a DMOS type bias section 19 connected to the vertical signal lines V1 to Vn for supplying a bias current to the pixel section 2; a noise suppressing section 6 for suppressing noise of the pixel signals outputted onto the vertical signal lines V1 to Vn; a horizontal scanning section 7 for selecting a column to be read out of the noise suppressing section 6; a horizontal signal line 8 for outputting a signal from the noise suppressing section 6; and a control section 12 for controlling the vertical scanning section 3, the DMOS type bias section 19, the noise suppressing section 6, and the horizontal scanning section 7.

Figure 14:
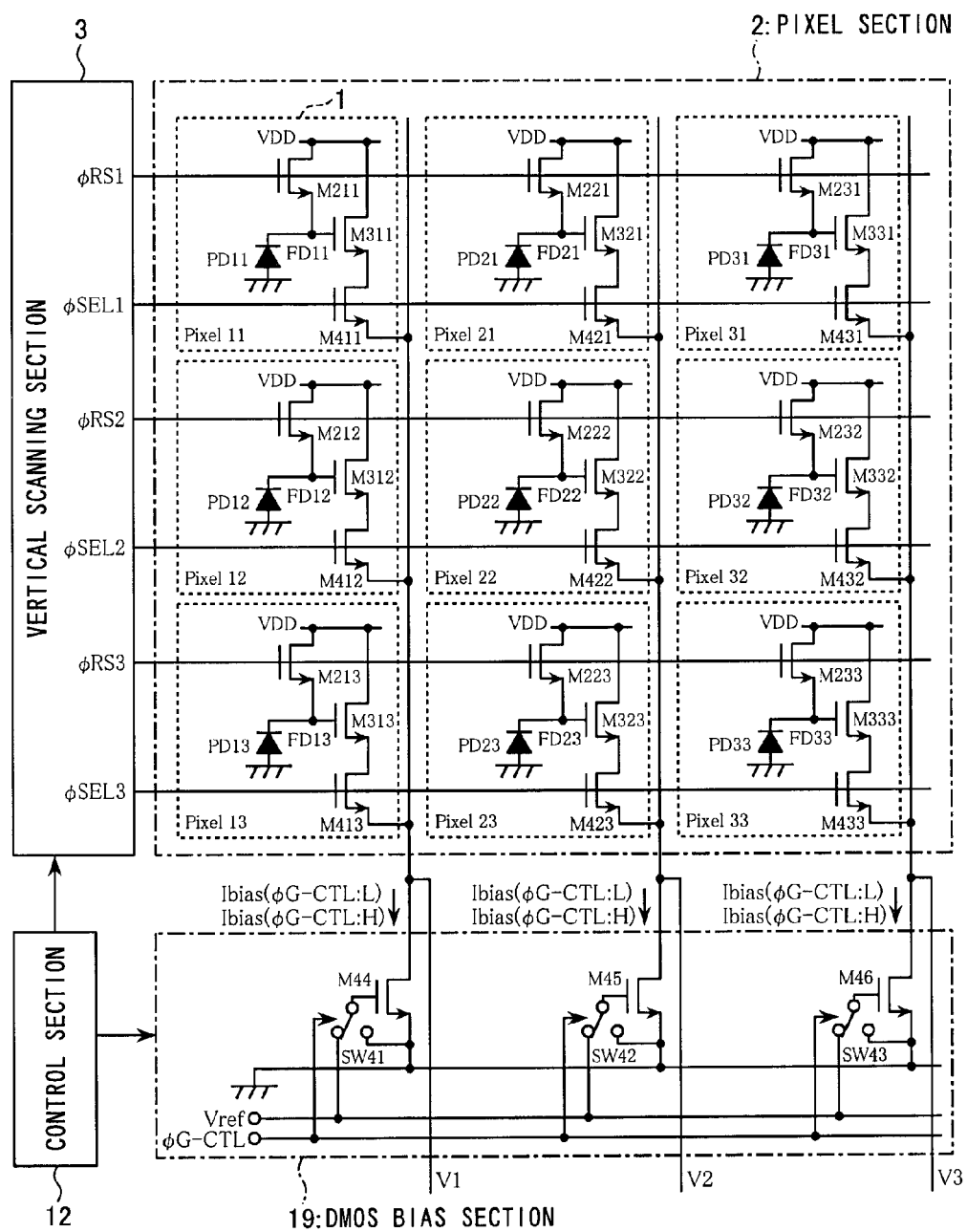
FIG. 14 is a circuit diagram showing construction of a portion corresponding to the pixel section, the vertical scanning section, the DMOS type bias section, and the vertical signal line in the fifth embodiment shown in FIG. 13.

FIG. 14 is a circuit diagram specifically showing construction of the portion of the pixel section 2, the vertical scanning section 3, the DMOS type bias section 19, and the vertical signal lines V1 to V3 in the fifth embodiment shown in FIG. 13. It is to be noted that like components as those in the prior-art example shown in FIG. 1 are denoted by like reference symbols. The portion of the circuit construction shown in FIG. 14 includes: a pixel section 2 where pixel cells 1 are disposed into rows and columns so as to result a 3-row by 3-column arrangement; a vertical scanning section 3 for selecting a row to be read out of the pixel section 2; vertical signal lines V1 to V3 for outputting pixel signals by the unit of column from the pixel section 2; and the DMOS type bias section 19 connected to the vertical signal lines V1 to V3 for supplying a bias current to the pixel section 2.

The construction of the pixel cell 1, the pixel section 2, and the vertical scanning section 3 is similar to the prior-art example shown in FIG. 1 and will not be described. The DMOS type bias section 19 includes: DMOS transistors for bias current M44 to M46; a reference voltage terminal Vref; gate switches SW41 to SW43 for switching the connection of the gate of the bias current DMOS transistor M44 to M46 between the reference voltage terminal Vref and the source; and a gate-switch control signal φ G-CTL for switching the gate switches. The bias current when the gate of the DMOS transistor M44 to M46 and the reference voltage terminal Vref are connected is supposed as Ibias (φ G-CTL: L level) and the bias current when the gate and the source of the bias current DMOS transistor M44 to M46 are connected to each other as Ibias (φ G-CTL: H level). Here, the bias current Ibias (φ G-CTL: H level) at the time of connecting between the gate and source of the bias current DMOS transistor M44 to M46 is determined by regulating a threshold characteristic of the DMOS transistor M44 to M46 in the manufacturing process. It is to be noted that Ibias (φ G-CTL: H level) and Ibias (φ G-CTL: L level) are set so that Ibias (φ G-CTL: H level) is smaller. Further, the gate-switch control signal φ G-CTL is outputted from the control section 12.

Figure 15:
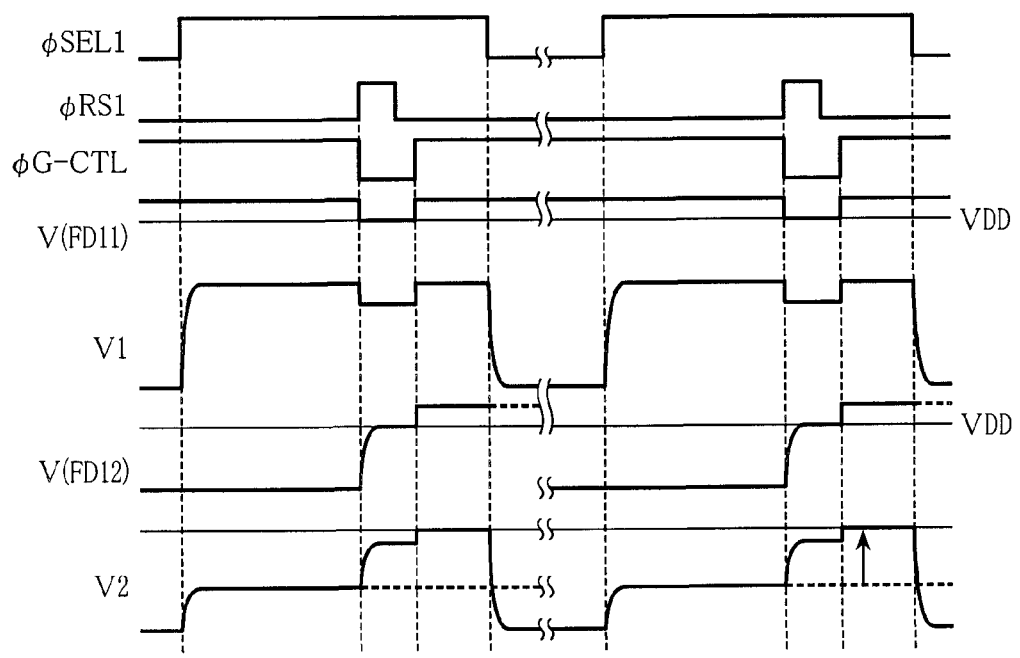
FIG. 15 is a drive timing chart for explaining operation of the fifth embodiment.

FIG. 15 schematically shows a drive timing to explain an operation of the fifth embodiment using the DMOS type bias section 19 shown in FIG. 14. A description will be given below with respect to the operation of a case where a first pixel row from the upper side of the pixel section 2 is selected by the vertical scanning section 3, and an intense light is incident only on the pixel Pixel21 while light is scarcely incident on the pixels Pixel11 and Pixel31. Since, in this case, the conditions of the pixels Pixel11 and Pixel31 are substantially the same, the operation of the pixels Pixel11 and Pixel21 will be described. Initially, an advance reset where accumulated electric charges at the photodiodes PD11 and PD12 of the pixels Pixel11 and Pixel21 are previously reset is performed.

At first, the row select transistors M411 and M421 are turned ON by driving the row select control signal φ SEL1 to H level so as to connect the first row pixels Pixel11 and Pixel21 respectively to the vertical signal lines V1 and V2. The gate switches SW41 and SW42 are then switched to the side of the reference voltage terminal Vref by bringing the gate-switch control signal φ G-CTL to L level whereby the bias current of the bias current DMOS transistor M44 and M45 is set to Ibias (φ G-CTL: L level). At the same time, the reset transistors M211 and M221 are turned ON by driving the reset signal φ RS1 to H level. The electric charges accumulated at the photodiodes PD11 and PD21 are thereby reset and at the same time the floating diffusions FD11 and FD21 are reset to the pixel power supply voltage VDD.

Subsequently, the reset transistors M211 and M221 are turned OFF by returning the reset signal φ RS1 to L level so as to bring the floating diffusions FD11 and FD21 into high impedance state. At this time, of the pixels Pixel11 and Pixel21, the reset signal potentials Vres(FD11) and Vres (FD21) of the floating diffusions FD11 and FD21 both attain the pixel power supply potential VDD. Accordingly, the reset signal potentials Vres(V1) and Vres(V2) on the vertical signal lines V1 and V2 are obtained as in the following equations (23), (24).

$$Vres(V1)=Vres(FD11)-VGS(M311)'=VDD-VGS(M311)' \quad (23)$$

$$Vres(V2)=Vres(FD21)-VGS(M321)'=VDD-VGS(M321)' \quad (24)$$

where VGS(M311)' and VGS(M321)' are gate-source voltages when the bias current Ibias (φ G-CTL: L level) flows into the amplification transistors M311 and M321.

Next, the gate switches SW41 and SW42 are switched to the source side by driving the gate switch control signal φ G-CTL to H level so that the bias currents of the bias current DMOS transistors M44 and M45 are set to Ibias (φ G-CTL: H level). Here, supposing Δ Ibias as a bias current difference at each DMOS transistor M44 and M45 between the case of bringing the gate switch control signal φ G-CTL to L level and the case of driving the gate switch control signal φ G-CTL to H level, the bias currents flowing into the amplification transistors M311 and M321 are respectively reduced by Δ Ibias when the gate switch control signal φ G-CTL is driven to H level. The gate-source voltages of the amplification transistors M311 and M321 are thereby respectively reduced by Δ VGS(M311) and Δ VGS(M321) so that the vertical signal lines V1 and V2 are respectively increased by amount corresponding to Δ VGS(M311) and Δ VGS(M321).

At this time, since the floating diffusion FD11 in its high-impedance state is capacity-coupled to the vertical signal line V1 by the gate-source capacitance CGS(M311) of the amplification transistor M311, it is affected by the increase Δ VGS (M311) on the vertical signal line V1. Accordingly, the reset potential Vres(FD11) of the floating diffusion FD11 is increased by Δ V(FD11) as shown in the following equation (25).

$$Vres(FD11) = VDD + \Delta V(FD11) \quad (25)$$
$$= VDD + \Delta VGS(M311) \times \{CGS(M311)/C(FD11)\}$$

$$C(FD11) = CJ(PD11) + CGS(M211) + CJ(M211) + CGD(M311) + CGS(M311) \quad (26)$$

Here, as shown in the above equation (26), C(FD11) is a total of the capacitance components occurring at the floating diffusion FD11: CJ(PD11) is a junction capacitance of the photodiode PD11; CGS(M211) a gate-source capacitance of the reset transistor M211: CJ(M211) a source junction capacitance of the reset transistor M211; CGD(M311) a gate-drain capacitance of the amplification transistor M311; and CGS(M311) a gate-source capacitance of the amplification transistor M311.

Further, since the floating diffusion FD21 is capacity-coupled to the vertical signal line V2 by the gate-source capacitance CGS(M321) of the amplification transistor M321, it is affected by the increase Δ VGS(M321) on the vertical signal line V2. Accordingly, the reset potential Vres (FD21) of the floating diffusion FD21 is increased by Δ V(FD21) as shown in the following equation (27).

$$Vres(FD21) = VDD + \Delta V(FD21) \quad (27)$$
$$= VDD + \Delta VGS(M321) \times \{CGS(M321)/C(FD21)\}$$

$$C(FD21) = CJ(PD21) + CGS(M221) + CJ(M221) + CGD(M321) + CGS(M321) \quad (28)$$

Here, as shown in the above equation (28), C(FD21) is a total of the capacitance components occurring at the floating diffusion FD21: CJ(PD21) is a junction capacitance of the photodiode PD21; CGS(M221) a gate-source capacitance of the reset transistor M221: CJ(M221) a source junction capacitance of the reset transistor M221; CGD(M321) a gate-drain capacitance of the amplification transistor M321; and CGS(M321) a gate-source capacitance of the amplification transistor M321.

Subsequently, the row select transistors M411 and M421 are turned OFF by bringing the row select control signal φ SEL1 to L level so as to disconnect the first row pixels Pixel11 and Pixel21 respectively from the vertical signal lines V1 and V2. The advance reset operation of the photodiodes PD11 and PD12 is ended by the above operation.

Next, light signal outputs accumulated at the photodiodes PD11 and PD12 of the pixels Pixel11 and Pixel21 are obtained. At first, the row select transistors M411 and M421 are turned ON by driving the row select control signal φ SEL1 to H level so as to connect the first row pixels Pixel11 and Pixel21 respectively to the vertical signal lines V1 and V2. At this time, since H level of the gate-switch control signal φ G-CTL is continued, the bias current DMOS transistors M44 and M45 remain in the condition of their respective gate and source being connected, and supply a bias current Ibias (φ G-CTL: H level).

A light signal potential Vsig(FD11) at the floating diffusion FD11 of the pixel Pixel11 on which light is scarcely incident attains the value shown in the equation (25) that is a reset level. Accordingly, a light signal potential Vsig(V1) on the vertical signal line V1 is obtained as in the following equation (29).

$$Vsig(V1) = Vres(FD11) - VGS(M311) \quad (29)$$
$$= VDD + \Delta V(FD11) - VGS(M311)$$

where VGS(M311) is a gate-source voltage of the amplification transistor M311 when a bias current Ibias (φ G-CTL: H level) flows into the amplification transistor M311.

A significant potential change Δ V occurs and it falls substantially to a ground level, on the other hand, of a light signal potential Vsig(FD21) at the floating diffusion FD21 of the pixel Pixel21 on which the intense light is incident. For this reason, the amplification transistor M321 is turned OFF so that a light signal potential Vsig(V2) on the vertical signal line V2 attains the ground level as shown in the following equation (30).

$$Vsig(V2)=0 \quad (30)$$

Since the bias current DMOS transistor M45 is thereby turned OFF, the current value flowing onto a ground wiring changes. A source potential of the bias current DMOS transistor M44 is then also changed due to the effect of resistance component that occurs on the ground wiring. The bias current Ibias (φ G-CTL: H level) of the bias current DMOS transistor M44 of which gate and source are connected to each other however is not affected by the change in the source potential, since it is determined by a threshold voltage of the bias current DMOS transistor M44. For this reason, the light signal potential Vsig(V1) on the vertical signal line V1 of the pixel Pixel11 on which light is scarcely incident does not change even when the intense light is incident on the pixel Pixel21. At this time, the light signal potentials Vsig(V1) and Vsig(V2) on the vertical signal lines V1 and V2 are then temporarily stored respectively at the noise suppressing section 6.

Finally, reset outputs of resetting accumulated electric charges of the photodiodes PD11 and PD12 are obtained from the pixels Pixel11 and Pixel21. This operation is identical to the advance reset and a detailed description of the operation will be omitted. The reset signal potentials Vres(FD11) and Vres(FD21) of the floating diffusions FD11 and FD21 at the end attain the values shown in the above equations (25) and (27). Accordingly, the reset signal potentials Vres(V1) and Vres(V2) on the vertical signal lines V1 and V2 are respectively obtained as in the following equations (31), (32).

$$Vres(V1) = Vres(FD11) - VGS(M311) \quad (31)$$
$$= VDD + \Delta V(FD11) - VGS(M311)$$

$$Vres(V2) = Vres(FD21) - VGS(M321) \quad (32)$$
$$= VDD + \Delta V(FD21) - VGS(M321)$$

where VGS(M311) and VGS(M321) are gate-source voltages when the bias current Ibias (φ G-CTL: H level) flows into the amplification transistors M311 and M321.

These reset signal potentials Vres(V1) and Vres(V2) on the vertical signal lines V1 and V2 are subjected to differential processing respectively with light signal potentials Vsig(V1) and Vsig(V2) at the noise suppressing section 6 so that difference signal outputs Vsub(V1) and Vsub(V2) corresponding to incident light are respectively obtained as in the following equations (33), (34).

$$Vsub(V1) = Vres(V1) - Vsig(V1) = 0 \quad (33)$$

$$Vsub(V2) = Vres(V2) - Vsig(V2) \quad (34)$$
$$= VDD + \Delta V(FD21) - VGS(M321)$$

As is apparent from equation (33), even when an intense light is incident on the pixel Pixel21 so that an output level on the vertical signal line V2 attains that of the ground, an occurrence of the white transverse stripe can be suppressed because the bias current of the bias current DMOS transistor M44 is a constant value Ibias (φ G-CTL: H level). Subsequently, the row select transistors M411 and M421 are turned OFF by bringing the row select control signal φ SEL1 to L level so as to disconnect the first row pixels Pixel11 and Pixel21 respectively from the vertical signal lines V1 and V2.

Thus with the present embodiment, even when an output level of the vertical signal line of a pixel column on which an intense light is incident attains a ground level, an occurrence of the white transverse stripe can be suppressed because the bias current of the other pixel columns does not change. In addition, since the output level of the vertical signal line can be lowered to the ground level, it is also possible to meet a lowering in voltage of the pixel power supply voltage VDD. In addition, since the reset potential of floating diffusion can be ascended, it is possible to meet a further lowering in voltage of the pixel power supply voltage VDD.

Figure 16A:
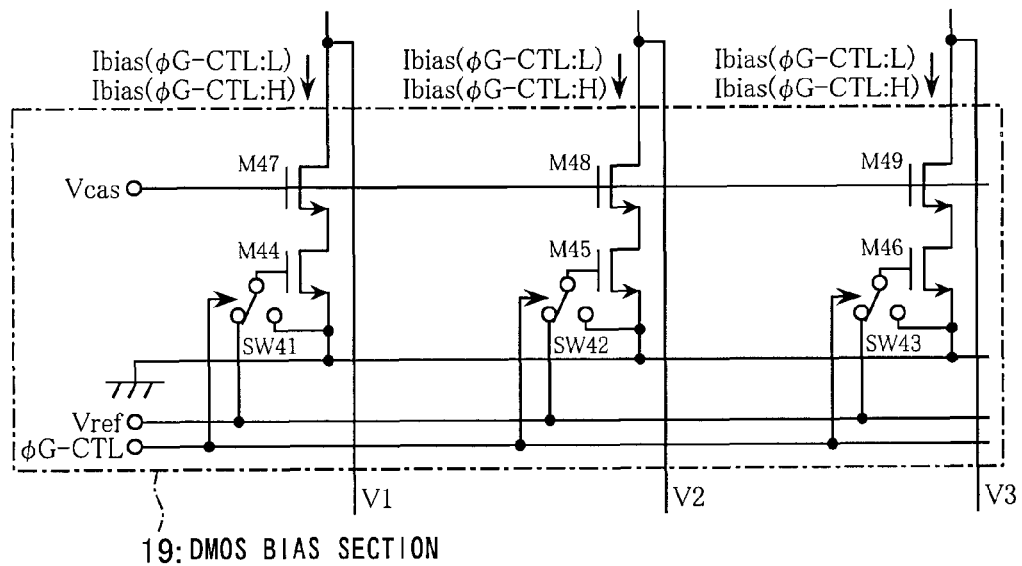
FIGS. 16A and 16B each is a circuit diagram showing a modification of the DMOS type bias section in the fifth embodiment shown in FIG. 14.
Figure 16B:
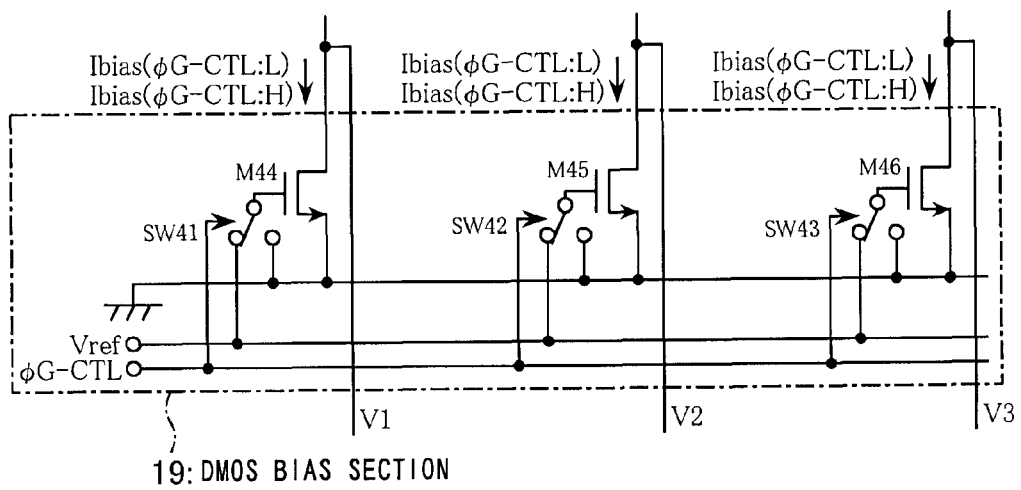

It is to be noted that various modifications of the present embodiment are possible. For example, a cascode type circuit as shown in FIG. 16A can also be used as the DMOS type bias section 19. In the modification shown in FIG. 16A, transistors for cascode M47 to M49 having a gate connected to a cascode voltage terminal Vcas are connected to the drain side of the bias current DMOS transistors M44 to M46 shown in FIG. 14. The bias currents Ibias (φ G-CTL: L level) and Ibias (φ G-CTL: H level) are then supplied onto the vertical signal lines V1 to V3 through the cascode transistors M47 to M49. An output resistance from the drain side of the cascode transistor M47 to M49 is thereby increased so that constant current characteristics of the bias currents Ibias (φ G-CTL: L level) and Ibias (φ G-CTL: H level) are improved. Further as shown in FIG. 16B, the connecting point of the gate switch SW41 to SW43 toward the source side of the bias current DMOS transistor M44 to M46 may be formed in the vicinity of the ground wiring.

Embodiment 6

Figure 17A:
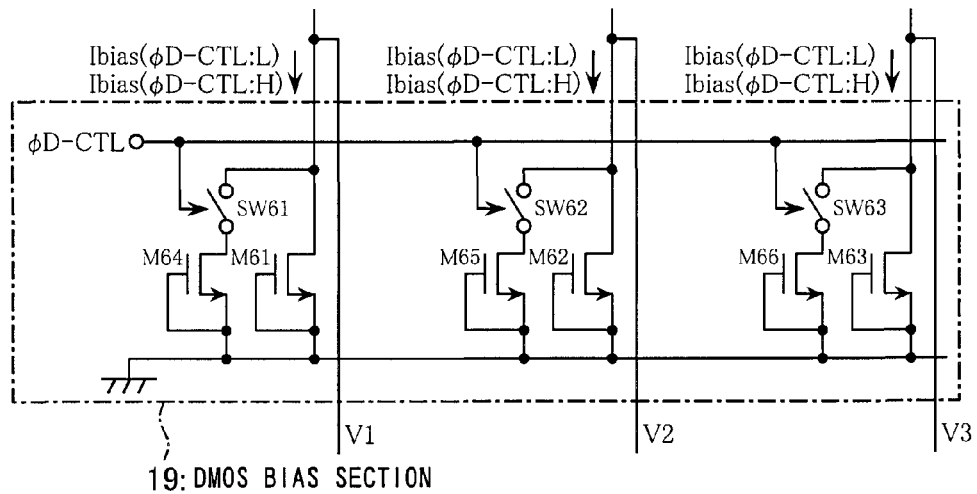
FIGS. 17A and 17B show a circuit diagram showing construction of the DMOS type bias section in a sixth embodiment and a drive timing chart for explaining its operation.

A sixth embodiment of the invention will now be described. FIG. 17A is a circuit diagram showing construction of a main portion in the sixth embodiment of the solid-state imaging apparatus using amplified MOS sensor according to the invention. The sixth embodiment is achieved by changing the construction of the DMOS type bias section 19 in the fifth embodiment. The DMOS type bias section 19 according to this embodiment shown in FIG. 17A includes: bias current DMOS transistors M61 to M66; drain switches SW61 to SW63 for controlling connection of the drain terminal of the bias current DMOS transistor M64 to M66; and a drain switch control signal φ D-CTL for switching/controlling the drain switch. It is to be noted that the bias current DMOS transistors M61 to M63 and the bias current DMOS transistors M64 to M66 are respectively connected in parallel through the drain switches SW61 to SW63.

Figure 17B:
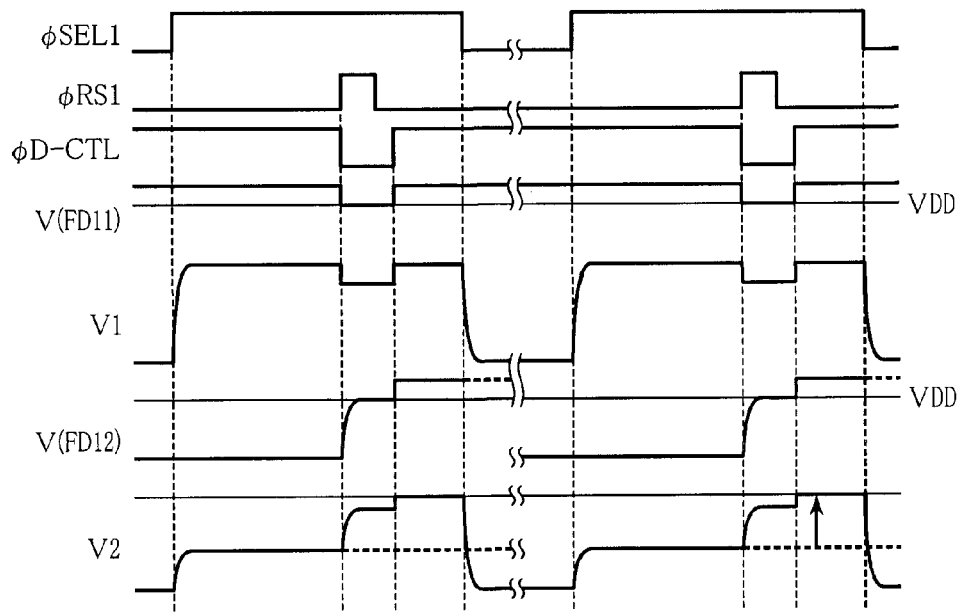

Here, the transistor sizes of the bias current DMOS transistors M61 to M66 are all the same, and a bias current Ibias is determined by regulating a threshold voltage in the manufacturing process. Further, it is supposed that the drain switches SW61 to SW63 are turned ON and the bias current Ibias (φ D-CTL: L level) on the vertical signal lines V1 to V3 attains 2×Ibias when the drain switch control signal φ D-CTL is brought to L level, and that the drain switches SW61 to SW63 are turned OFF and the bias current Ibias (φ D-CTL: H level) on the vertical signal lines V1 to V3 attains Ibias when the drain switch control signal φ D-CTL is driven to H level. A drive timing chart for explaining operation of thus constructed DMOS type bias section is shown in FIG. 17B. The only change in the drive operation of this embodiment as shown in FIG. 17B from the drive timing of the fifth embodiment shown in FIG. 15 is from the gate switch control signal φ G-CTL to the drain switch control signal φ D-CTL; the rest of the drive timings is identical and will not be described in detail.

Thus with the present embodiment, even when an output level of the vertical signal line of a pixel column on which an intense light is incident attains a ground level, an occurrence of the white transverse stripe can be suppressed because the bias current of the other pixel columns does not change. In addition, since the reset potential of floating diffusion can be ascended, it is possible to meet a further lowering in voltage of the pixel power supply voltage VDD. Further, the circuit construction of the DMOS bias section becomes simpler because the reference voltage terminal VREF is unnecessary.

It is to be noted that various modifications are possible also of the present embodiment. For example, similar advantages are obtained also when the gate of the DMOS transistors M61 to M66 are respectively connected to a source wiring instead of directly connecting the gate to the source. Further, similar advantages are obtained also when the transistor size is changed between the DMOS transistors M61 to M63 and the DMOS transistors M64 to M66.

Embodiment 7

Figure 18:
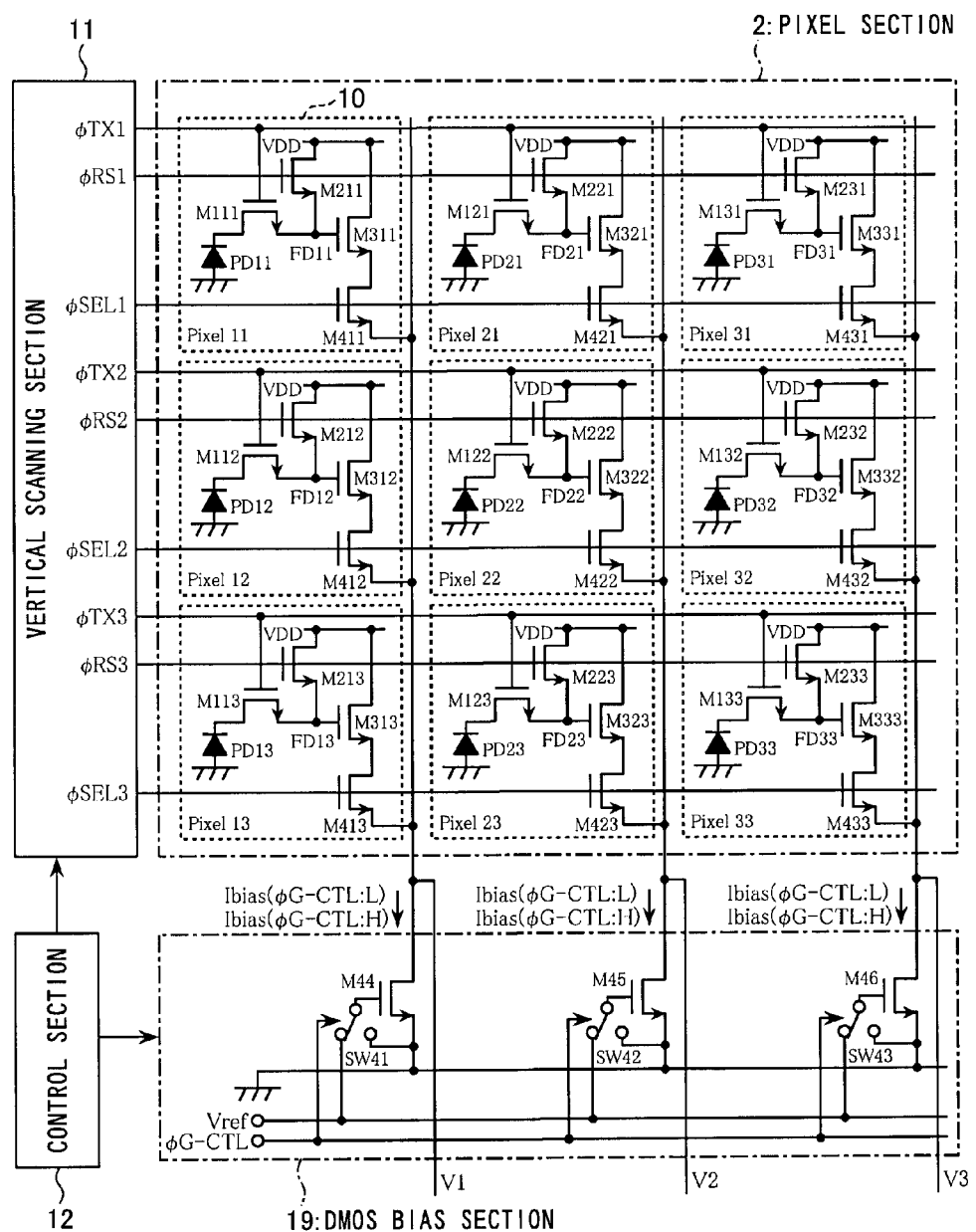
FIG. 18 is a circuit diagram showing construction of a seventh embodiment.

A seventh embodiment of the invention will now be described. FIG. 18 is a circuit diagram showing construction of the seventh embodiment of the solid-state imaging apparatus using amplified MOS sensor according to the invention where the construction of the pixel cell and the vertical scanning section is changed from the fifth embodiment shown in FIG. 14. The circuit diagram shown in FIG. 18 is to explain the construction of a pixel section 2, a vertical scanning section 11, a DMOS type bias section 19, and vertical signal lines V1 to V3, where like components as in the fifth embodiment shown in FIG. 14 are denoted by like reference symbols. A pixel cell 10, when the pixel cell Pixel11 is taken, includes: a photodiode PD11 that is a photoelectric conversion section; a floating diffusion FD11 for converting electric charges accumulated at the photodiode PD11 into a voltage; a transfer transistor M111 for transferring electric charges from the photodiode PD11 to the floating diffusion FD11; a reset transistor M211 for resetting the floating diffusion FD11 to a pixel power supply voltage VDD; an amplification transistor M311 for amplifying the voltage of the floating diffusion FD11; and a row select transistor M411 for selecting the pixels of each row.

The pixel section 2 in this case is shown as placing the pixel cells 10 side by side into 3 rows by 3 columns. The vertical scanning section 11 outputs: transfer control signals φ TX1 to φ TX3 for controlling the transfer transistors M111 to M133; reset control signals φ RS1 to φ RS3 for controlling the reset transistors M211 to M233; and row select control signals φ SEL1 to φ SEL3 for controlling operation of the row select transistors M411 to M433.

Figure 19:
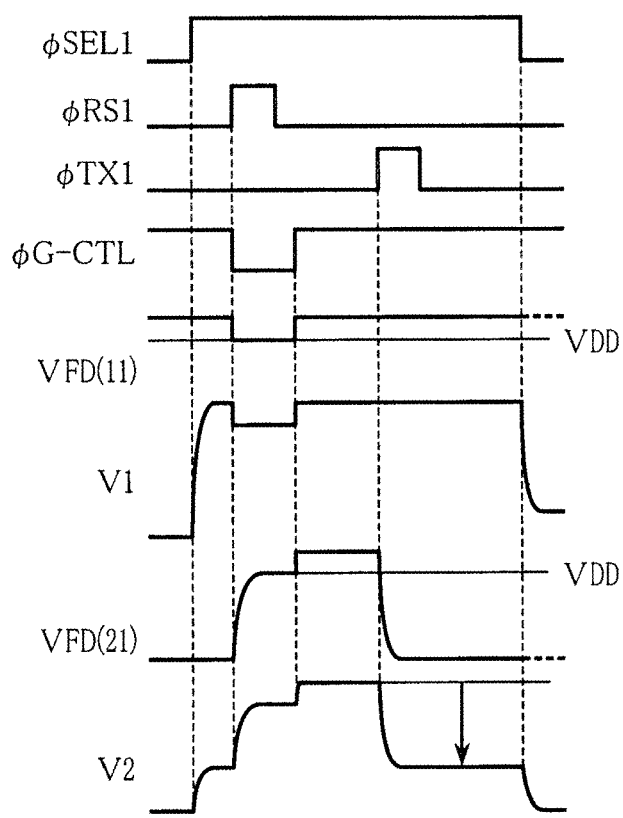
FIG. 19 is a drive timing chart for explaining operation of the seventh embodiment shown in FIG. 18.

FIG. 19 schematically shows a drive timing to explain an operation of the seventh embodiment using the DMOS type bias section 19. Here, the operation is shown of the case where a first pixel row from the upper side of the pixel section 2 is selected by the vertical scanning section 11, and an intense light is incident only on the pixel Pixel21 while light is scarcely incident on the pixels Pixel11 and Pixel31. Since, in this case, the conditions of the pixels Pixel11 and Pixel31 are substantially the same, the operation of the pixels Pixel11 and Pixel21 will be described. Initially, accumulated electric charges at the floating diffusions FD11 and FD12 are reset. At first, the row select transistors M411 and M421 are turned ON by driving the row select control signal φ SEL1 to H level so as to connect the first row pixels Pixel11 and Pixel21 respectively to the vertical signal lines V1 and V2. The gate switches SW41 and SW42 are then switched to the side of the reference voltage terminal VREF by bringing the gate-switch control signal φ G-CTL to L level whereby the bias currents of the bias current DMOS transistors M44 and M45 are set to Ibias (φ G-CTL: L level). At the same time, the reset transistors M211 and M221 are turned ON by driving the reset signal φ RS1 to H level so as to reset the floating diffusions FD11 and FD21 to the pixel power supply voltage VDD.

Subsequently, the reset transistors M211 and M221 are turned OFF by returning the reset signal φ RS1 to L level so as to bring the floating diffusions FD11 and FD21 into high impedance state. At this time, the reset signal potentials Vres (FD11) and Vres(FD21) of the floating diffusions FD11 and FD21 attain the pixel power supply potential VDD. Accordingly, the reset signal potentials Vres(V1) and Vres(V2) on the vertical signal lines V1 and V2 are obtained respectively as in the following equations (35), (36).

$$Vres(V1)=Vres(FD11)-VGS(M311)=VDD-VGS(M311)' \quad (35)$$

$$Vres(V2)=Vres(FD21)-VGS(M321)=VDD-VGS(M321)' \quad (36)$$

Where VGS(M311)' and VGS(M321)' are gate-source voltages when the bias current Ibias (φ G-CTL: L level) flows into the amplification transistors M311 and M321. Further, the gate switches SW41 and SW42 are switched to the source side by driving the gate switch control signal φ G-CTL to H level so that the bias currents of the bias current DMOS transistors M44 and M45 are set to Ibias (φ G-CTL: H level).

Here, supposing a bias current difference Δ Ibias at each bias current DMOS transistor M44 and M45 as Δ Ibias=Ibias(φ G-CTL: L)−Ibias(φ G-CTL: H), the bias currents flowing into the amplification transistors M311 and M321 are respectively reduced by Δ Ibias. The gate-source voltages VGS(M311) and VGS(M321) of the amplification transistors M311 and M321 are thereby respectively reduced by Δ VGS(M311) and Δ VGS(M321) so that the vertical signal lines V1 and V2 are increased respectively by amount corresponding to Δ VGS(M311) and Δ VGS(M321).

At this time, since the floating diffusion FD11 in its high-impedance state is capacity-coupled to the vertical signal line V1 by the gate-source capacitance CGS(M311) of the amplification transistor M311, it is affected by the increase Δ VGS (M311) on the vertical signal line V1. Accordingly, the reset potential Vres(FD11) of the floating diffusion FD11 is increased by Δ V(FD11) as shown in the following equation (37).

$$Vres(FD11) = VDD + \Delta V(FD11) \quad (37)$$
$$= VDD + \Delta VGS(M311) \times$$
$$\{CGS(M311)/C(FD11)\}$$

$$C(FD11) = CGS(M111) + CJ(M111) + \quad (38)$$
$$CGS(M211) + CJ(M211) + CGD(M311) + CGS(M311)$$

Here, as shown in the above equation (38), C(FD11) is a total of the capacitance components occurring at the floating diffusion FD11: CGS(M111) is a gate-source capacitance of the transfer transistor M111; CJ(M111) a source junction capacitance of the transfer transistor M111; CGS(M211) a gate-source capacitance of the reset transistor M211: CJ(M211) a source junction capacitance of the reset transistor M211; CGD(M311) a gate-drain capacitance of the amplification transistor M311; and CGS(M311) a gate-source capacitance of the amplification transistor M311.

Further, since the floating diffusion FD21 in its high-impedance state is capacity-coupled to the vertical signal line V2 by the gate-source capacitance CGS(M321) of the amplification transistor M321, it is affected by the increase Δ VGS (M321) on the vertical signal line V2. Accordingly, the reset potential Vres(FD21) of the floating diffusion FD21 is increased by Δ V(FD21) as shown in the following equation (39).

$$Vres(FD21) = VDD + \Delta V(FD21) \quad (39)$$
$$= VDD + \Delta VGS(M321) \times$$
$$\{CGS(M321)/C(FD21)\}$$

$$C(FD21) = CGS(M121) + CJ(M121) + \quad (40)$$
$$CGS(M221) + CJ(M221) + CGD(M321) + CGS(M321)$$

Here, as shown in the above equation (40), C(FD21) is a total of the capacitance components occurring at the floating diffusion FD21: CGS(M121) is a gate-source capacitance of the transfer transistor M121; CJ(M121) a source junction capacitance of the transfer transistor M121; CGS(M221) a gate-source capacitance of the reset transistor M221; CJ(M221) a source junction capacitance of the reset transistor M221; CGD(M321) a gate-drain capacitance of the amplification transistor M321; and CGS(M321) a gate-source capacitance of the amplification transistor M321.

Accordingly, the reset signal potentials Vres(V1) and Vres(V2) on the vertical signal lines V1 and V2 corresponding to the pixel Pixel11 on which light is scarcely incident and the pixel Pixel21 on which an intense light is incident are respectively obtained as in the following equations (41), (42).

$$Vres(V1) = Vres(FD11) - VGS(M311) \quad (41)$$
$$= VDD + \Delta V(FD11) - VGS(M311)$$

$$Vres(V2) = Vres(FD21) - VGS(M321) + \Delta VGS(M321) \quad (42)$$
$$= VDD + \Delta V(FD21) - VGS(M321)$$

where VGS(M311) and VGS(M321) are respectively gate-source voltages when the bias current Ibias (φ G-CTL: H level) flows into the amplification transistors M311 and M321. At this time, the reset signal potentials Vres(V1) and Vres(V2) on the vertical signal lines V1 and V2 are respectively temporarily stored at the noise suppressing section 6.

Next, light signal outputs accumulated at the photodiodes PD11 and PD12 of the pixels Pixel11 and Pixel21 are obtained. At first, in the condition where the first row pixels Pixel11 and Pixel21 are respectively connected to the vertical signal lines V1 and V2 with continuing H level of the row select control signal φ SEL1, the transfer transistors M111 and M121 are turned ON by driving the transfer control signal φ TX1 to H level to thereby transfer electric charges accumulated at the photodiodes PD11 and PD12 to the floating diffusions FD11 and FD21. Subsequently, the transfer transistors M111 and M121 are turned OFF by bringing the transfer control signal φ TX1 back to L level. At this time, since H level of the gate switch control signal φ G-CTL is continued, the bias current DMOS transistors M44 and M45 continue to generate the bias current Ibias (φ G-CTL: H level).

A light signal potential Vsig(FD11) at the floating diffusion FD11 of the pixel Pixel11 on which light is scarcely incident attains the value shown in the equation (37) that is a reset level. A significant potential change ΔV occurs, on the other hand, of a light signal potential Vsig(FD21) at the floating diffusion FD21 of the pixel Pixel21 on which the intense light is incident, and its potential Vsig(FD21) falls substantially to a ground level. For this reason, the amplification transistor M321 is turned OFF so that a light signal potential Vsig(V2) on the vertical signal line V2 attains the ground level as shown in the following equation (43).

$$Vsig(V2)=0 \quad (43)$$

Since the bias current DMOS transistor M42 is thereby turned OFF, a current value flowing onto a ground wiring to which the source of the bias current DMOS transistor M41 is connected changes. A source potential of the bias current DMOS transistor M44 is then also changed due to the effect of resistance component that occurs on the ground wiring. The bias current Ibias (φ G-CTL: H level) of the bias current DMOS transistor M44 however is not affected by the change in the source potential, since it is determined by the threshold value. For this reason, the light signal potential Vsig(V1) on the vertical signal line V1 of the pixel Pixel11 on which light is scarcely incident does not change even when the intense light is incident on the pixel Pixel21.

These light signal potentials Vsig(V1) and Vsig(V2) on the vertical signal lines V1 and V2 are respectively subjected to differential processing with reset potentials Vres(V1) and Vres(V2) at the noise suppressing section 6 so that difference signals Vsub(V1) and Vsub(V2) corresponding to incident light are obtained respectively as shown in the following equations (44), (45).

$$Vsub(V1) = Vsig(V1) - Vres(V1) = 0 \quad (44)$$

$$Vsub(V2) = Vsig(V1) - Vres(V1) \quad (45)$$
$$= -\{VDD + \Delta V(FD21) - VGS(M321)\}$$

As is apparent from equation (44), even when an intense light is incident on the pixel Pixel21 so that an output level of the vertical signal line V2 attains the ground level, an occurrence of the white transverse stripe can be suppressed because the bias current of the bias current DMOS transistor M44 is a constant value Ibias (φ G-CTL: H level). Subsequently, the row select transistors M411 and M421 are turned OFF by bringing the row select control signal φ SEL1 to L level so as to disconnect the first row pixels Pixel11 and Pixel21 respectively from the vertical signal lines V1 and V2.

Thus with the present embodiment, even when an output level of the vertical signal line of pixel column on which an intense light is incident attains a ground level, an occurrence of the white transverse stripe can be suppressed because the bias current of the other pixel columns does not change. In addition, since the reset potential of floating diffusion can be ascended, it is possible to meet a further lowering in voltage of the pixel power supply voltage VDD. It is to be noted that various modifications are possible also of the present embodiment. For example, the types of circuits shown in FIGS. 16A, 16B and FIG. 17A may be used as the DMOS type bias section 19.

Embodiment 8

Figure 20A:
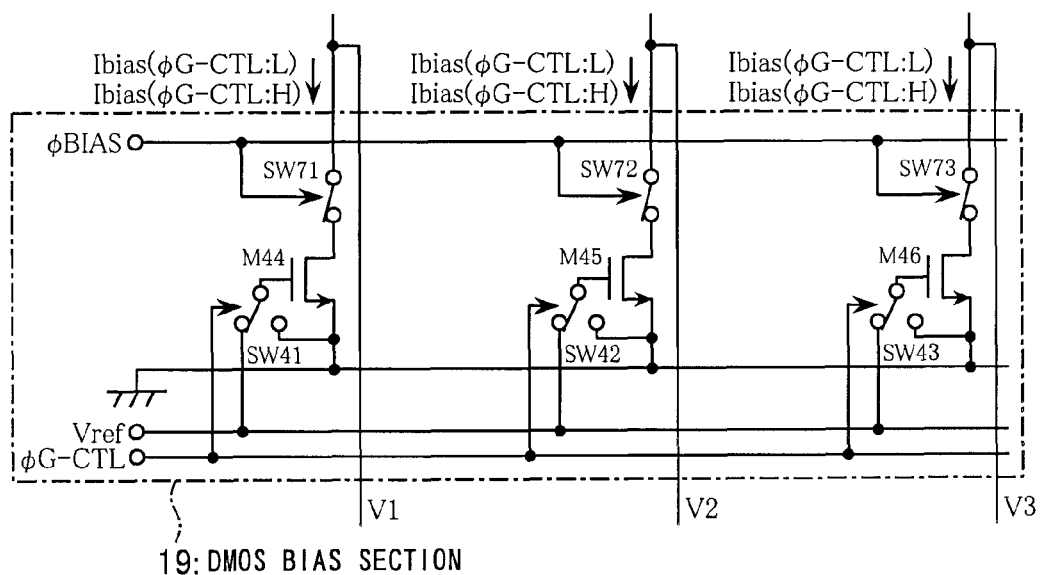
FIGS. 20A and 20B show a circuit diagram showing construction of the DMOS type bias section in an eighth embodiment and a drive timing chart for explaining its operation.

An eighth embodiment of the invention will now be described. FIG. 20A is a circuit diagram showing a main portion of the eighth embodiment of the solid-state imaging apparatus using amplified MOS sensor according to the invention. In the present embodiment, the construction of DMOS type bias section 19 is changed from the embodiment 7 shown in FIG. 18. In the DMOS type bias section 19 according to the present embodiment as shown in FIG. 20A, bias switches SW71 to SW73 for respectively connecting the bias current DMOS transistor M44 to M46 to the vertical signal line V1 to V3 and a bias switch control signal φ BIAS for switching/controlling ON/OFF of the bias switches SW71 to SW73 are added to the DMOS type bias section in the seventh embodiment shown in FIG. 18. The bias switch control signal φ BIAS is driven in the manner of a pulse to reduce unnecessary bias currents.

Figure 20B:
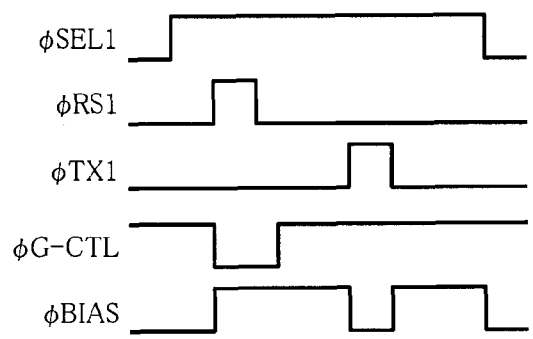

Drive timing for explaining operation of thus constructed eighth embodiment is shown in FIG. 20B. It is the same operation as the drive timing of the seventh embodiment shown in FIG. 19 except that the bias switch control signal φ BIAS is driven in the manner of a pulse, and will not be described in detail. Thus with the present embodiment, even when an output level of the vertical signal line of pixel column on which an intense light is incident attains a ground level, an occurrence of the white transverse stripe can be suppressed because the bias current of the other pixel columns does not change. In addition, since the reset potential of floating diffusion can be ascended, it is possible to meet a further lowering in voltage of the pixel power supply voltage VDD. Furthermore, a reduced power use can be achieved, since it is possible to cause the bias current to flow only in those periods where it is necessary (periods from the attaining of H level of reset control signal φ RS1 to the attaining of H level of the transfer control signal φ TX1, and from the attaining of L level of the transfer control signal φ TX1 to the attaining of L level of the row select control signal φ SEL1).

It is to be noted that various modifications are possible also of the present embodiment. For example, it may be combined with the DMOS type bias section shown in FIGS. 16A, 16B and 17A.

The circuit construction and drive method of the present invention may be variously modified without departing from the scope of appended claims. For example, even when the constituent components and drive method of the unit pixel is changed, it can be met by changing the circuit construction and/or drive method of the vertical scanning section, the sample-and-hold type bias section, or the DMOS type bias section.

According to the first and second aspects of the invention as has been described by way of the above embodiments, even when a potential of a vertical signal line connected to any specific pixel column significantly falls due to an incidence of intense light on pixel, an occurrence of the white transverse stripe can be suppressed because the other pixel columns are not affected. According to the third aspect: even when an output level of a vertical signal line connected to any specific pixel column significantly falls due to an incidence of intense light on pixel, an occurrence of the white transverse stripe can be suppressed because the other pixel columns are not affected; and in addition, a simpler circuit construction can be achieved. According to the fourth and fifth aspects: even when an output level of a vertical signal line connected to any specific pixel column significantly falls due to an incidence of intense light on pixel, an occurrence of the white transverse stripe can be suppressed because the other pixel columns are not affected; and in addition, there are many types that can be used as the circuit construction. According to the sixth aspect: even when an output level of a vertical signal line connected to any specific pixel column significantly falls due to an incidence of intense light on pixel, an occurrence of the white transverse stripe can be suppressed because the other pixel columns are not affected; and in addition, a lower voltage can be used as the pixel power supply voltage because an input potential of the amplification means can be stepped up. According to the seventh aspect: even when an output level of a vertical signal line connected to any specific pixel column significantly falls due to an incidence of intense light on pixel, an occurrence of the white transverse stripe can be suppressed because the other pixel columns are not affected; and in addition, a variance in pixel signals can be suppressed because the pixel signals can be read out with using an equal bias current over a plurality of rows.

According to the eighth aspect: even when an output level of a vertical signal line connected to any specific pixel column significantly falls due to an incidence of intense light on pixel, an occurrence of the white transverse stripe can be suppressed because the other pixel columns are not affected; and at the same time, a lower voltage can be used as the pixel power supply voltage. According to the ninth aspect: even when an output level of a vertical signal line connected to any specific pixel column significantly falls due to an incidence of intense light on pixel, an occurrence of the white transverse stripe can be suppressed because the other pixel columns are not affected; and in addition, a lower voltage can be used as the pixel power supply voltage because an input potential on the amplification means can be stepped up. According to the tenth aspect, even when an output level of a vertical signal line connected to any specific pixel column significantly falls due to an incidence of intense light on pixel, an occurrence of the white transverse stripe can be suppressed because the other pixel columns are not affected; and in addition, a lower voltage can be used as the pixel power supply voltage because an input potential on the amplification means can be stepped up. Further, the number of control terminals at the DMOS type bias section can be reduced. According to the eleventh aspect, even when an output level of a vertical signal line connected to any specific pixel column significantly falls due to an incidence of intense light on pixel, an occurrence of the white transverse stripe can be suppressed because the other pixel columns are not affected; and in addition, a lower voltage can be used as the pixel power supply voltage because an input potential on the amplification means can be stepped up. Further, it is possible to reduce a current consumed at the DMOS type bias section.

What is claimed is:

1. A solid-state imaging apparatus comprising:
   a pixel section having pixels two-dimensionally arranged into rows and columns each pixel containing a photoelectric conversion means, an amplification means for amplifying and outputting as pixel signal a signal electric charge of said photoelectric conversion means, and a reset means for resetting signal electric charges accumulated at said amplification means;
   a vertical scanning section for selecting a row to be read out of said pixel section;
   a vertical signal line provided column by column for outputting the signal from said pixel section; and
   a DMOS type bias section connected to said vertical signal line having DMOS transistor for setting a bias current flowing into said amplification means;
   wherein said DMOS type bias section sets said bias current for said amplification means to be smaller than a bias current at the time of resetting said amplification means when reading from said amplification means signal electric charges accumulated at said photoelectric conversion means, and
   wherein said DMOS type bias has a switch means for switching a connecting point of the gate of said DMOS transistor to a first reference voltage or to a source side wiring of said DMOS transistor so as to change the connecting point of the gate of said DMOS transistor from said first reference voltage to the source side wiring with using said switch means after resetting of the signal electric charges inputted to said amplification means is ended so that the bias current for said amplification means is smaller when the gate of said DMOS transistor is connected to the source side wiring.

2. A solid-state imaging apparatus comprising:
a pixel section having pixels two-dimensionally arranged into rows and columns each pixel containing a photoelectric conversion means, an amplification means for amplifying and outputting as pixel signal a signal electric charge of said photoelectric conversion means, and a reset means for resetting signal electric charges accumulated at said amplification means;
a vertical scanning section for selecting a row to be read out of said pixel section;
a vertical signal line provided column by column for outputting the signal from said pixel section; and
a DMOS type bias section connected to said vertical signal line having DMOS transistor for setting a bias current flowing into said amplification means;
wherein said DMOS type bias section sets said bias current for said amplification means to be smaller than a bias current at the time of resetting said amplification means when reading from said amplification means the signal electric charges accumulated at said photoelectric conversion means,
wherein said DMOS type bias section has a plurality of parallel-connected DMOS transistors respectively connected at gates and source side wirings to each of said vertical signal lines so that the number of connected ones of said DMOS transistors is reduced after resetting of signal electric charges inputted to said amplification means is ended.

\* \* \* \* \*